United States Patent
Kojima et al.

(10) Patent No.: US 7,143,756 B2
(45) Date of Patent: Dec. 5, 2006

(54) CONTROL DEVICE AND CONTROL METHOD FOR INTERNAL COMBUSTION ENGINE

(75) Inventors: Daisuke Kojima, Nagoya (JP); Masumi Kinugawa, Okazaki (JP); Kiyonori Sekiguti, Okazaki (JP); Yasuhiro Kariya, Obu (JP); Tatsumasa Sugiyama, Anjyo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 174 days.

(21) Appl. No.: 10/479,961

(22) PCT Filed: Feb. 25, 2003

(86) PCT No.: PCT/IB03/00698

§ 371 (c)(1),
(2), (4) Date: Dec. 8, 2003

(87) PCT Pub. No.: WO03/072916

PCT Pub. Date: Sep. 4, 2003

(65) Prior Publication Data

US 2004/0177605 A1 Sep. 16, 2004

(30) Foreign Application Priority Data

Feb. 26, 2002 (JP) ........................ 2002-049533

(51) Int. Cl.
*F02D 41/00* (2006.01)

(52) U.S. Cl. ........................ 123/698; 123/699
(58) Field of Classification Search ................. 123/434, 123/672, 676, 698, 699, 700, 703
See application file for complete search history.

(56) References Cited

U.S. PATENT DOCUMENTS

| 5,116,611 A | 5/1992 | Masuoka et al. |
| 5,423,203 A | * 6/1995 | Namiki et al. ............... 73/1.06 |
| 6,211,273 B1 | 4/2001 | Bru-Magniez et al. |

FOREIGN PATENT DOCUMENTS

| EP | 0 297 505 | 1/1989 |
| EP | 1 174 601 A | 1/2002 |

(Continued)

OTHER PUBLICATIONS

Cochin et al.; New substituted polymethylenes by free radical polymerization of bulky fumarates and their properties; Polymer, vol. 41, No. 11, pp. 3895–3903; May 2000.
See PCT search report.

*Primary Examiner*—T. M. Argenbright
(74) *Attorney, Agent, or Firm*—Oliff & Berridge, PLC

(57) ABSTRACT

If the amount of fuel added to exhaust gas becomes excessive as a result of an abnormality of an addition agent supply unit (60), the air-fuel ratio of exhaust as decreases. If an exhaust gas air-fuel ratio obtained from a value output from an A/F sensor (4) remains equal to or smaller than a predetermined value for a predetermined period, an ECU (2) determines that an addition agent supply unit (60) is abnormal. Upon detection of an abnormality of the addition agent supply unit (60), the ECU (2) incrteases an amount of EGR gas recirculated to the intake side by an EGR unit (40), reduces an amount of fuel injection from injectors (11), and restricts an operational state of an engine body (10) to a low-speed/low-load state. Also, the ECU (2) turns a warning lamp (7) on, warns a driver of the abnormality of the addition agent supply unit (60), and makes it possible to pull a vehicle over safely.

30 Claims, 17 Drawing Sheets

FOREIGN PATENT DOCUMENTS

| | | |
|---|---|---|
| EP | 1 176 292 A | 1/2002 |
| EP | 1 176 295 A | 1/2002 |
| JP | 58-47066 | 3/1983 |
| JP | 63-61989 | 11/1988 |
| JP | 2-674 | 1/1990 |
| JP | 2-675 | 1/1990 |
| JP | A 5-302509 | 11/1993 |
| JP | A 6-108828 | 4/1994 |
| JP | 8-512287 | 12/1996 |
| JP | A 10-141048 | 5/1998 |
| JP | 2001-504530 | 4/2001 |
| JP | A 2002-70619 | 3/2002 |
| JP | A 2002-129945 | 5/2002 |
| JP | A 2002-188428 | 7/2002 |
| JP | A 2002-213231 | 7/2002 |
| WO | WO 94/24168 | 10/1994 |
| WO | WO 98/18455 | 5/1998 |
| WO | WO 99/38898 | 8/1998 |

\* cited by examiner

F I G. 20
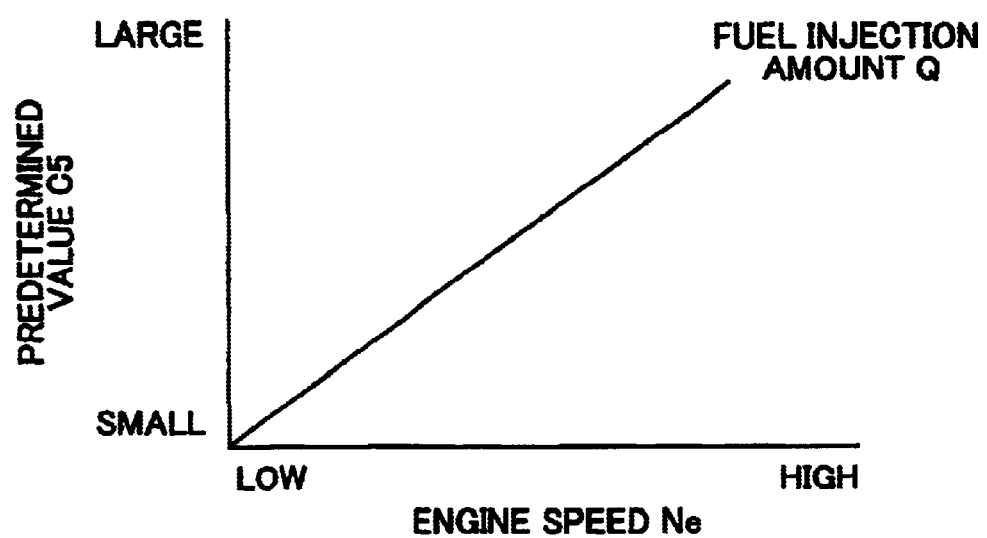

CONTROL DEVICE AND CONTROL METHOD FOR INTERNAL COMBUSTION ENGINE

FIELD OF THE INVENTION

The invention relates to a control device and a control method for an internal combustion engine and, more particularly, to a control device that is employed in an internal combustion engine and that detects an abnormality of addition agent supply means for adding an addition agent to exhaust gas purification means so as to purify exhaust gas.

BACKGROUND OF THE INVENTION

According to an art related to the invention, exhaust gas purification means is installed in an internal combustion engine. To cause the exhaust gas purification means to function and purify exhaust gas, for example, as in the case where exhaust gas is purified by reducing NOx by means of an NOx occlusion-reduction type catalyst, an addition agent composed of a reducing agent such as fuel is required. As one of such methods of exhaust gas purification, there is a method in which fuel is injected into an exhaust pipe of an internal combustion engine. Arts for causing exhaust gas purification means to function by adding fuel to exhaust gas are disclosed, for example, in Japanese Patent Application Laid-Open No. 6-108829, Japanese Patent Application Laid-Open No. 10-141048, and Japanese Patent Application Laid-Open No. 5-302509.

The arts disclosed in the above-mentioned publications, namely, Japanese Patent Application Laid-Open No. 6-108829, Japanese Patent Application Laid-Open No. 10-141048, and Japanese Patent Application Laid-Open No. 5 -302509 relate to the addition of light oil as fuel with the intention of purifying exhaust gas by means of exhaust gas purification means, and to optimizing control thereof.

Addition agent supply means for adding an addition agent is installed in an exhaust pipe of an internal combustion engine. Hence, the addition agent supply means is exposed to exhaust gas that contains unburnt components such as carbon particulates, particulate matters generated from sliding portions of the internal combustion engine, or the like. As a result, there is an apprehension, for example, that foreign matters will be stuck in a supply port of the addition agent supply means or that open-close control of the supply port will be adversely affected. In such a case, the addition agent supply means continues to supply exhaust gas with a reducing agent. Thus, if fuel such as light oil is used as the reducing agent, fuel burns in the exhaust gas purification means and the temperature thereof tends to become extraordinarily high. If the temperature of the exhaust gas purification means rises, a problem such as a deterioration in performance of the exhaust gas purification means is caused.

On the other hand, there is an apprehension that soot, viscous components, and the like contained in exhaust gas will adhere to the supply port of the addition agent supply means. In this case, the supply port of the addition agent supply means is clogged, and it becomes difficult to supply exhaust gas with fuel. As a result, the exhaust gas purification means may not function sufficiently. That is, if an NOx reduction catalyst is used as an example of the exhaust gas purification means, the air-fuel ratio of exhaust gas cannot be shifted toward the rich side. Hence, it becomes difficult to reduce NOx. This causes a problem in that the amount of NOx to be discharged cannot be reduced. If a particulate filter for collecting particulate matters contained in exhaust gas is used as an example of the exhaust gas purification means, the temperature of the filter cannot be raised. Thus, combustion of the collected particulate matters becomes insufficient, and the particulate matters are deposited in the filter. This causes a problem in that driveability and fuel consumption deteriorate due to an increase in pressure loss.

DISCLOSURE OF THE INVENTION

It is an object of the invention to provide a control device that is employed in an internal combustion engine and that detects an abnormality of addition agent supply means such as excessive or insufficient supply of an addition agent.

In a first aspect of the invention, a control device for an internal combustion engine comprises abnormality determination means for determining whether or not addition agent supply means is abnormal. If the amount of an addition agent supplied from addition agent supply means increases, oxygen contained in exhaust gas is consumed through oxidation of the addition agent such as combustion. Thus, if the oxygen concentration of exhaust gas remains equal to or lower than a predetermined concentration for a predetermined period, it is probable that the amount of the addition agent supplied to exhaust gas be excessive. Hence, if the oxygen concentration remains low, the abnormality determination means determines that the addition agent supply means is abnormal. Accordingly, an abnormality of the addition agent supply means, that is, excessive supply of the addition agent can be detected from a concentration of oxygen contained in exhaust gas.

In the above-mentioned first aspect, it is appropriate that a predetermined exhaust gas oxygen concentration from which the abnormality determination means makes determination on an abnormality of the addition agent supply means be set in accordance with an operational state of the internal combustion engine. For example, if the internal combustion engine assumes a high-speed/high-load state, the amount of exhaust gas discharged from the internal combustion engine increases. Therefore, the concentration of oxygen contained in exhaust gas increases as well. Hence, the predetermined concentration is set in accordance with an operational state of the internal combustion engine. Accordingly, it is possible to accurately determine, in accordance with an operational state of the internal combustion engine, whether or not the addition agent supply means is abnormal.

In the above-mentioned aspect, it is appropriate that the predetermined period in which the exhaust gas oxygen concentration from which the abnormality determination means makes determination on an abnormality of the addition agent supply means remains low be set in accordance with an operational state of the internal combustion engine. Even in the case where the operational state of the internal combustion engine abruptly changes, for example, even in the case where the internal combustion engine makes a shift from a high-speed/high-load state to a low-speed/low-load state, the concentration of oxygen contained in exhaust gas discharged from the internal combustion engine gently changes. That is, the exhaust gas oxygen concentration changes with delay with respect to changes in operational state. In particular, since changes in oxygen concentration are retarded as the internal combustion engine makes a shift to a low-speed/low-load state, the predetermined period needs to be prolonged. Thus, the predetermined period is set in accordance with an operational state of the internal combustion engine. Accordingly, it is possible to accurately determine, in accordance with an operational state of the internal combustion engine, whether or not the addition agent supply means is abnormal.

In a control device for an internal combustion engine in accordance with a second aspect of the invention, if the rate of change in a decrease in exhaust gas oxygen concentration becomes equal to or larger than a first predetermined value, the abnormality determination means compares an oxygen concentration minimum value within a predetermined period from that moment with a detected oxygen concentration. If a ratio of the detected oxygen concentration to the oxygen concentration minimum value becomes equal to or smaller than a second predetermined value, the abnormality determination means determines that the addition agent supply means is abnormal. For example, intermittent addition of the addition agent (rich spike) is implemented to cause the exhaust gas purification means to function. Thus, the oxygen concentration minimum value within the predetermined period is compared with the detected oxygen concentration so as to distinguish between rich addition and excessive supply of fuel resulting from an abnormality of the addition agent supply means. Accordingly, an abnormality of the addition agent supply means, that is, excessive supply of the addition agent can be detected from a concentration of oxygen contained in exhaust gas.

In a third aspect of the invention, a control device for an internal combustion engine comprises abnormality determination means for determining whether or not addition agent supply means is abnormal. If the amount of an addition agent discharged from the addition agent supply means increases, the temperature of exhaust gas purification means rises, for example, through combustion of the addition agent. Thus, if the temperature of the exhaust gas purification means remains equal to or higher than a predetermined temperature for a predetermined period, it is probable that the amount of the addition agent supplied to exhaust gas be excessive. Hence, if the temperature of the exhaust gas purification means remains high, the abnormality determination means determines that the addition agent supply means is abnormal. Even in the case where a decrease or a change in concentration of oxygen contained in exhaust gas is small, excessive supply of the addition agent from the addition agent supply means can be detected by detecting a temperature of the exhaust gas purification means. Accordingly, an abnormality of the addition agent supply means, that is, excessive supply of the addition agent can be detected from a concentration of oxygen contained in exhaust gas.

In the above-mentioned first to third aspects, it is appropriate that the control device comprise operational state restriction means for restricting an operational state of the internal combustion engine if it is determined that the addition agent supply means is abnormal. The operational state restriction means increases, for example, an amount of exhaust gas recirculated to the internal combustion engine. Thus, the concentration of oxygen contained in exhaust gas decreases, and the temperature of the exhaust gas purification means is inhibited from rising. Thus, the operational state of the internal combustion engine is restricted, and the exhaust gas purification means can be prevented well in advance from deteriorating in performance as a result of a rise in temperature. Further, it is also appropriate that the control device comprise abnormality display means for displaying an abnormality of the addition agent supply means if it is determined that the addition agent supply means is abnormal. Thus, a driver operating the internal combustion engine can be informed that the addition agent supply means is abnormal. Accordingly, by checking what is displayed by the abnormality display means, the driver can stop operation of the internal combustion engine before the exhaust gas purification means deteriorates in performance.

In the above-mentioned aspects, it is appropriate that the operation state restriction means restrict the operational state of the internal combustion engine to a low-speed/low-load state. Thus, the amount of exhaust gas discharged from the internal combustion engine is reduced, and the absolute amount of oxygen contained in exhaust gas is reduced. Hence, the temperature of the exhaust gas purification means is inhibited from rising, and the exhaust gas purification means can be prevented from deteriorating in performance.

In a fourth aspect of the invention, a control device for an internal combustion engine comprises abnormality determination means for detecting a state in which the amount of an addition agent supplied from addition agent supply means is insufficient. In the case where the amount of the addition agent supplied from the addition agent supply means is insufficient, the decrease in oxygen concentration is reduced even if the addition agent is added to exhaust gas. Thus, if the addition agent is added in a pulse-like manner, for example, through rich spike, the decrease in oxygen concentration repeatedly becomes slight. Hence, if a minimum value of exhaust gas oxygen concentration that decreases due to addition of the addition agent successively becomes equal to or larger than a predetermined value a predetermined number of times of addition, the abnormality determination means determines that the addition agent supply means is abnormal. Accordingly, an abnormality of the addition agent supply means, that is, insufficient addition of the addition agent can be detected from a concentration of oxygen contained in exhaust gas.

In the above-mentioned aspect, it is appropriate that the control device comprise abnormality display means for displaying an abnormality of the addition agent supply means if it is determined that the addition agent supply means is abnormal. Thus, a driver operating the internal combustion engine can be informed that the addition agent supply means is abnormal. Accordingly, by checking what is displayed by the abnormality display means, the driver can stop operation of the internal combustion engine before the exhaust gas purification means deteriorates in performance.

BRIEF DESCRIPTION OF THE DRAWINGS

FIG. 20 is a schematic view showing how speed of the engine body, fuel injection amount, and a predetermined value C5 are related to one another.

DETAILED DESCRIPTION OF PREFERRED EMBODIMENTS

Hereinafter, a plurality of embodiments indicating how the invention is implemented will be described with reference to the drawings.

(First Embodiment)

Figure 1:
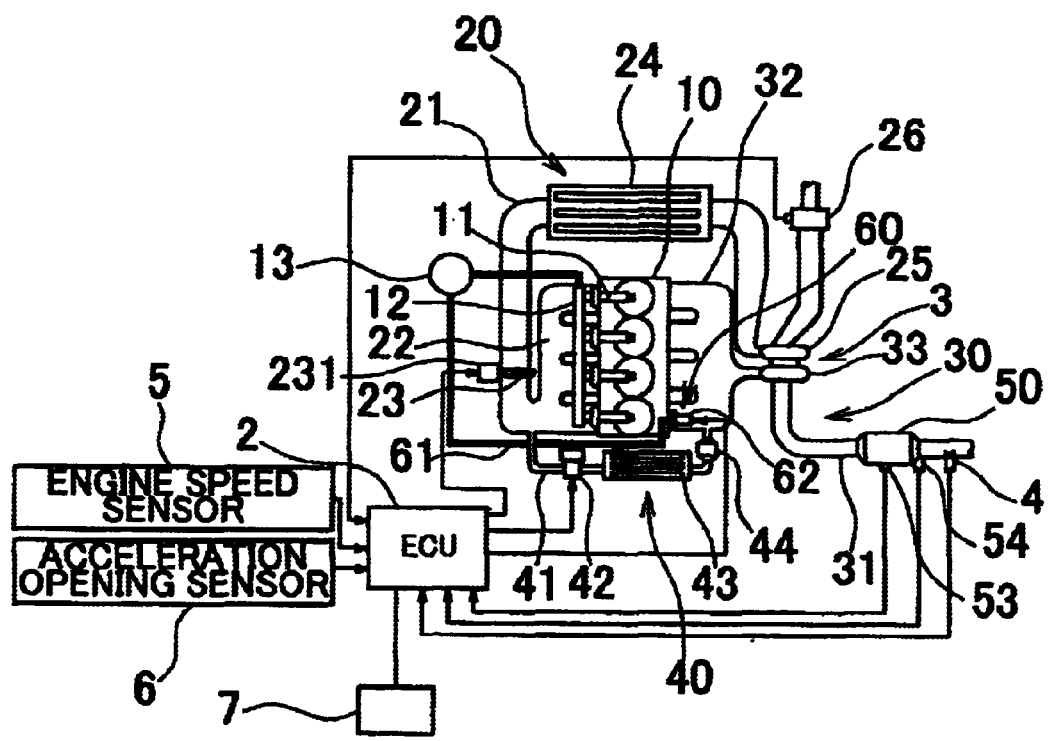
FIG. 1 is a schematic view of a diesel engine system to which a control device in accordance with a first embodiment of the invention is applied.

FIG. 1 shows a vehicular diesel engine system to which a control device for an internal combustion engine in accordance with the first embodiment of the invention is applied.

As shown in FIG. 1, a diesel engine system 1 is composed of an engine body 10 as an internal combustion engine, an intake unit 20, an exhaust unit 30, an exhaust gas recirculation (EGR) unit 40, an exhaust gas purification unit 50, an addition agent supply unit 60, and an ECU 2 as a control unit.

The intake unit 20 has an intake pipe 21, an intake manifold 22, an intake throttle valve 23, an intercooler 24, and the like. The intake pipe 21 extends across an intake turbine 25 of a turbocharger 3, the intercooler 24, and the intake throttle valve 23. The intake manifold 22 is connected to an end of the intake pipe 21 and establishes communication between the intake pipe 21 and intake ports of cylinders formed in the engine body 10. The intake throttle valve 23 has an actuator 231 that is composed, for example, of a solenoid, a vacuum actuator, and the like. The intake throttle valve 23 assumes a predetermined opening in accordance with a control signal transmitted to the actuator 231 from the ECU 2. If necessary, intake pressure is reduced by controlling opening of the intake throttle valve 23. Thus, when the engine body 10 is in a low-speed/low-load operational state, the flow rate of exhaust gas recirculated into the intake manifold from the EGR unit 40 is increased.

An air flow meter 26 is installed close to an intake air inlet of the intake pipe 21. The air flow meter 26 is constructed, for example, of a hot-wire flow meter and measures a mass flow rate of intake air flowing through the intake pipe 21. The measured mass flow rate of intake air is input to the ECU 2 as an intake air amount signal. Intake air sucked into the intake pipe 21 flows through the air flow meter 26 and then is pressurized by the intake turbine 25 of the turbocharger 3. The pressurized intake air is cooled by the intercooler 24 and then is supplied to the cylinders of the engine body 10 via the intake manifold 22.

A plurality of cylinders are formed in the engine body 10. In the case of the first embodiment, the number of the cylinders formed in the engine body 10 is four. Each of injectors 11 are installed in a corresponding one of the cylinders of the engine body 10. The injectors 11 are connected to a common rail 12. Light oil as fuel pressurized by a fuel pump 13 is accumulated in the common rail 12 in an accumulated state. Fuel accumulated in the common rail 12 in an accumulated state is supplied to the injectors 11. The fuel supplied to each of the injectors 11 from the common rail 12 is directly injected into a corresponding one of the cylinders of the engine body 10.

The exhaust unit 30 is connected to the engine body 10. The exhaust unit 30 has an exhaust pipe 31, an exhaust manifold 32, and the like. The exhaust manifold 32 establishes connection between exhaust ports of the cylinders of the engine body 10 and the exhaust pipe 31. The exhaust pipe 31 extends across an exhaust turbine 33 of the turbocharger 3. The exhaust turbine 33 of the turbocharger 3 is driven by the flow of exhaust gas discharged from the engine body 10. The exhaust turbine 33 is connected to the intake turbine 25 installed in the intake pipe 21. The intake turbine 25 is driven by a driving force of the exhaust turbine 33 that is driven by exhaust gas flow. The intake turbine 25 then pressurizes intake air flowing through the intake pipe 21.

The EGR unit 40 is installed between the exhaust unit 30 and the intake unit 20. The EGR unit 40 recirculates part of exhaust gas discharged from the engine body 10 to the intake side. The EGR unit 40 has an EGR pipe 41, an EGR valve 42, and an EGR cooler 43. The EGR pipe 41 establishes communication between the intake manifold 22 and the exhaust manifold 32. The EGR valve 42 is installed in the EGR pipe 41 and has an actuator (not shown) such as a stepper motor, a solenoid actuator, or the like. The EGR valve 42 is controlled in such a manner as to assume a predetermined opening by a control signal from the ECU 2, and controls flow rate of recirculated gas (EGR gas) flowing through the EGR pipe 41. The EGR cooler 43 is installed on the side of the exhaust manifold 32 with respect to the EGR valve 42, and cools EGR gas that is recirculated via the EGR pipe 41.

In the case of the first embodiment, a relatively large amount of EGR gas is recirculated whether the engine body 10 is in a low-speed/low-load state or in a high-speed/high-load state. Hence, intake air sucked into the cylinders of the engine body 10 contains a large amount of EGR gas. EGR gas is a high-temperature gas that is discharged from the cylinders of the engine body 10. Therefore, if a large amount of EGR gas is recirculated to the intake side, intake air temperature rises, and the volumetric efficiency of intake air sucked into the engine body 10 decreases. Thus, according to the first embodiment, the water-cooled or air-cooled EGR cooler 43 is installed in the EGR pipe 41 on the side of the exhaust manifold 32 with respect to the EGR valve 42. The temperature of EGR gas recirculated by the EGR cooler 43 is lowered. Thus, the volumetric efficiency of intake air is inhibited from being reduced, and recirculation of a relatively large amount of EGR gas is made possible.

If the amount of recirculation of EGR gas is increased, unburnt hydrocarbon components contained therein threaten to adhere to the EGR cooler 43 or the EGR valve 42. If the hydrocarbon components adhere to the EGR cooler 43 or the EGR valve 42, there is an apprehension that a passage of the EGR cooler 43 or a valve portion of the EGR valve 42 will be clogged. Thus, according to the first embodiment, a pre-cooler catalyst 44 for removing hydrocarbon components is installed on the side of the exhaust manifold 32 with respect to the EGR cooler 43. For example, an oxidation catalyst (three-way catalyst) is used as the pre-cooler catalyst 44.

Figure 2:
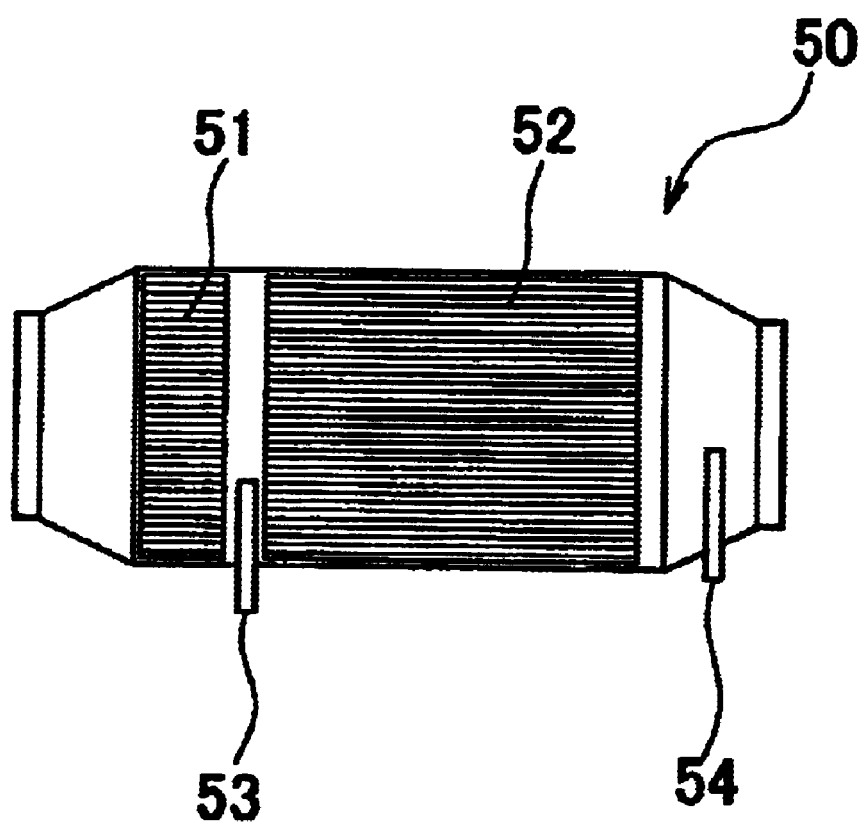
FIG. 2 is a schematic view of an exhaust gas purification unit of the diesel engine system to which the control device in accordance with the first embodiment of the invention is applied.

The exhaust gas purification unit 50 is installed in the exhaust pipe 31 on the side of an outlet of the turbocharger 3. As shown in FIG. 2, the exhaust gas purification unit 50 contains an NOx occlusion-reduction catalyst 51 that is disposed on the upstream side with respect to exhaust gas flow and a diesel particulate filter (DPF) 52 that is disposed on the downstream side with respect to exhaust gas flow. At least one component selected from an alkali metal such as potassium, sodium, or lithium, an alkali earth metal such as barium or calcium, and a rare earth such as cesium and a noble metal such as platinum are carried on a carrier such as alumina, whereby the NOx occlusion-reduction catalyst 51 is constructed. The NOx occlusion-reduction catalyst 51 occludes NOx when exhaust gas flowing thereinto has a lean air-fuel ratio, and reduces the NOx if the concentration of oxygen contained in exhaust gas flowing thereinto decreases. The DPF 52 is constructed, for example, of a filter made of a metal ceramic material, a ceramic porous material, or the like, and captures particulate matters contained in exhaust gas. An exhaust gas temperature sensor 53 as temperature detection means is disposed in the exhaust gas purification unit 50 between the NOx occlusion-reduction catalyst 51 and the DPF 52. An exhaust gas temperature sensor 54 as temperature detection means is disposed on the side of an exhaust gas outlet of the DPF 52.

Further, as shown in FIG. 1, an A/F sensor 4 as oxygen concentration detection means is installed on the side of an exhaust gas outlet of the exhaust gas purification unit 50. The A/F sensor 4 detects an air-fuel ratio of exhaust gas. Exhaust gas air-fuel ratio detected by the A/F sensor 4 is related to concentration of oxygen contained in exhaust gas. Thus, according to the first embodiment, the respective components are controlled on the basis of exhaust gas air-fuel ratio.

The ECU 2 is constructed as a known microcomputer in which a CPU (not shown), a RAM (not shown), a ROM (not shown), and an I/O circuit (not shown) are interconnected by a bidirectional bus (not shown). An engine speed sensor 5 for detecting a speed of the engine body 10, an accelerator opening sensor 6 for detecting an accelerator opening, and other sensors (not shown) including a coolant temperature sensor for detecting a temperature of coolant are connected to the ECU 2. An engine speed signal, an accelerator opening signal, and sensor output signals are input to the ECU 2. Temperatures detected by the exhaust gas temperature sensors 53, 54 are input to the ECU 2 as an internal temperature signal and an outlet temperature signal respectively. Furthermore, an air-fuel ratio detected by the A/F sensor 4 is input to the ECU 2 as an A/F signal.

The addition agent supply unit 60 has a fuel passage 61 and an addition injector 62. The fuel passage 61 establishes communication between the fuel pump 13 and the addition injector 62, and fuel that has not been pressurized by the fuel pump 13 is supplied to the addition injector 62. The addition injector 62 is installed in the exhaust pipe 31 and injects fuel into exhaust gas flowing through the exhaust pipe 31. In the case of a diesel engine as in the case of the first embodiment, light oil of fuel as a reducing agent is used as an addition agent.

The ECU 2 makes determination on a state of the engine body 10 on the basis of an engine speed signal input from the engine speed sensor 5, an accelerator opening signal input from the accelerator opening sensor 6, and sensor output signals input from the other sensors. The ECU 2 performs fundamental controls of the engine body 10 such as a control of fuel injection from the injectors 11, a control of speed of the engine body 10, and the like in accordance with the determined state of the engine body 10. In addition to these fundamental controls, the ECU 2 also functions as engine operation detection means for detecting an operational state of the engine body 10 on the basis of an engine speed signal, an accelerator opening signal, and an intake air amount signal each of which is input from a corresponding one of the sensors, constant-speed operation determination means for determining whether or not the engine body 10 is in a constant-speed operational state, abnormality determination means for determining, on the basis of an internal temperature signal or an outlet temperature signal, whether or not the addition agent supply unit 60 is abnormal, abnormality display means for advising, after it has been determined that the addition agent supply unit 60 is abnormal, a driver of its abnormality, and operational state restriction means for restricting an operational state of the engine body 10 after it has been determined that the addition agent supply unit 60 is abnormal. Furthermore, the ECU 2 calculates a drive timing for driving the addition injector 62 of the exhaust gas purification unit 50 on the basis of an engine speed signal, amounts of fuel injected into the cylinders from the injectors 11 respectively, and the like. The ECU 2 drives an electromagnetic valve (not shown) of the addition injector 62 in accordance with the calculated drive timing, and controls fuel injection from the addition injector 62.

A warning lamp 7 as abnormality display means is connected to the ECU 2. The warning lamp 7 is installed, for example, in an instrument panel of a dash-board of a vehicle equipped with the diesel engine system 1. If the ECU 2 detects an abnormality of the addition agent supply unit 60, the ECU 2 turns the warning lamp 7 on and advises a driver of the diesel engine system 1 of the occurrence of the abnormality.

Next, operation of the diesel engine system 1 in accordance with the first embodiment will be described.

In the first embodiment, the following description deals with detection of an abnormality in the case where fuel continues to be injected from the fuel addition injector 62 or leaks therefrom due to a malfunction of the addition agent supply unit 60, and a series of countermeasures to be taken afterwards. In the first embodiment, an abnormality of the addition agent supply unit 60 is detected using the A/F sensor 4.

Fuel supplied from the addition agent supply unit 60 burns in the exhaust gas purification unit 50. Hence, oxygen contained in exhaust gas is consumed, and the concentration of oxygen contained in exhaust gas discharged from the exhaust gas purification unit 50 decreases. As a result, if an excessive amount of fuel is added to exhaust gas from the addition agent supply unit 60, the air-fuel ratio of exhaust gas shifts toward the rich side. Thus, according to the first embodiment, an abnormality of the addition agent supply unit 60 is detected using changes in exhaust gas air-fuel ratio.

Hereinafter, operation of the control device for the internal combustion engine in accordance with the first embodiment will be described with reference to FIG. 3.

Figure 3:
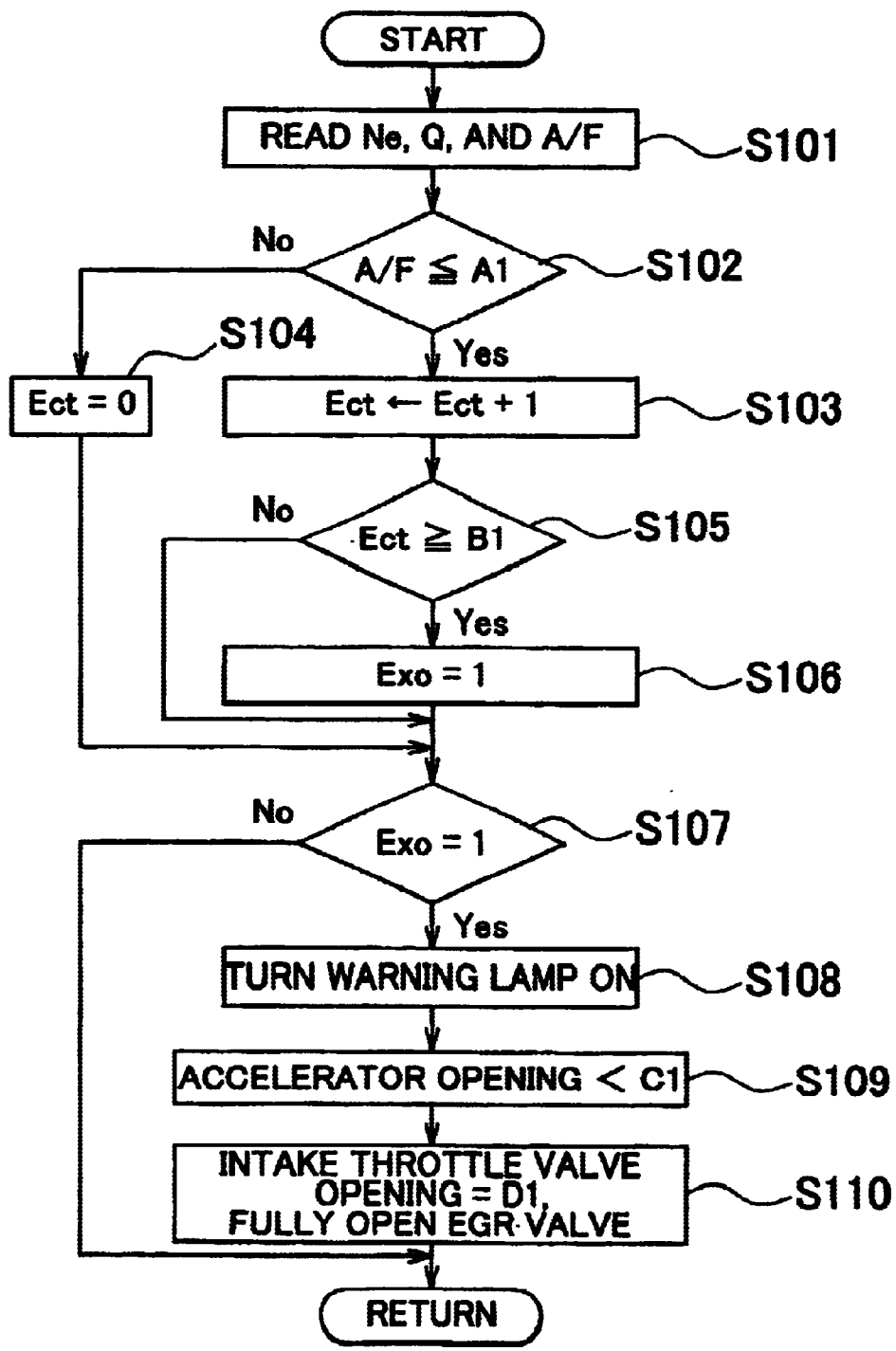
FIG. 3 is a flowchart showing operational flow of the diesel engine system to which the control device in accordance with the first embodiment of the invention is applied.

Processings shown in FIG. 3 are performed at intervals of a predetermined sampling period regardless of an operational state or a speed of the engine body 10. Thus, every time the processings shown in FIG. 3 are performed once, the count of a counter of the ECU 2 is increased by 1.

The ECU 2 reads an A/F signal from the A/F sensor 4, an engine speed signal from the engine speed sensor 5, and an amount Q of fuel injection from the injectors 11 at intervals of a predetermined period (S101). The fuel injection amount Q is calculated on the basis of values output from the other sensors. The ECU 2 detects an air-fuel ratio A/F from the read A/F signal and detects an engine speed Ne from the read engine speed signal.

Figure 4:
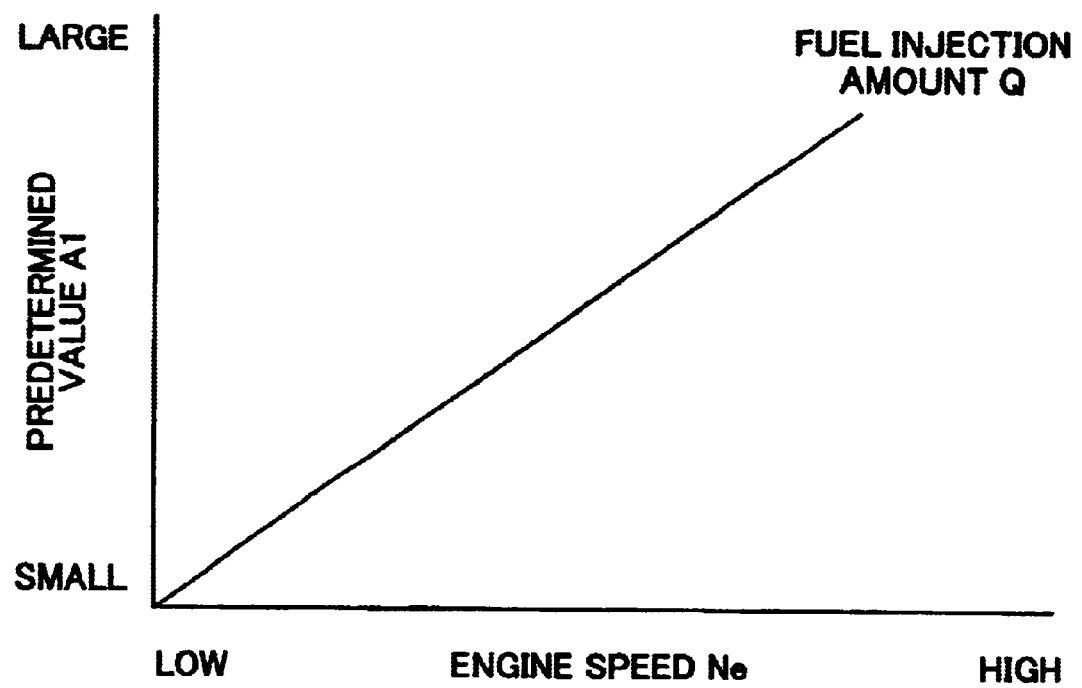
FIG. 4 is a schematic view showing how speed of an engine body, fuel injection amount, and a predetermined value A1 are related to one another.

The ECU 2 determines whether or not the detected air-fuel ratio A/F is equal to or smaller than the predetermined value A1 (S102). As shown in FIG. 4, the predetermined value A1 is recorded in the ROM of the ECU 2 as data correlated to the speed Ne of the engine body 10 and the fuel injection amount Q.

Figure 5:
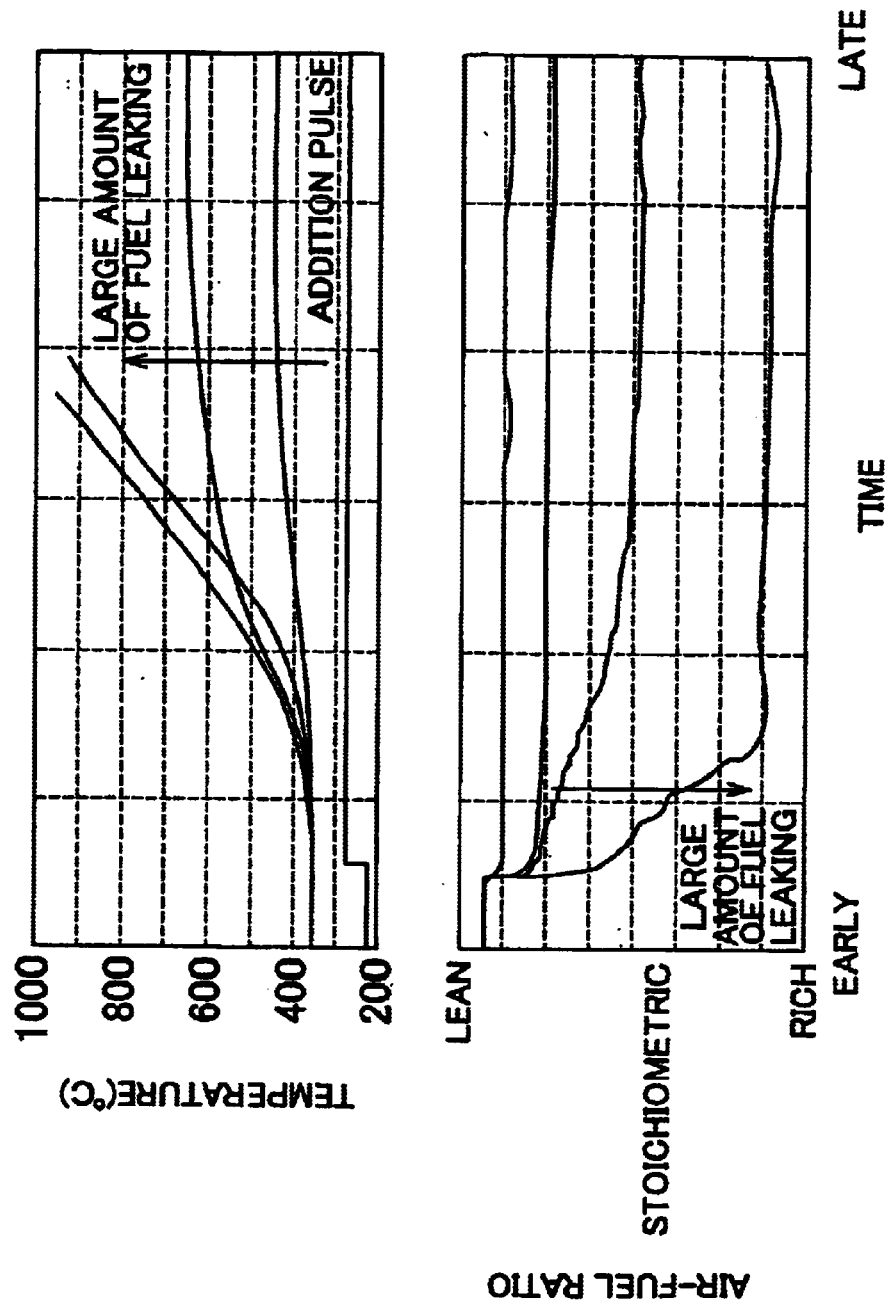
FIG. 5 is a schematic view showing how a relationship between fuel leakage from an addition agent supply unit and temperature of the exhaust gas purification unit and a relationship between fuel leakage from the addition agent supply unit and air-fuel ratio change in accordance with the lapse of time.
Figure 6:
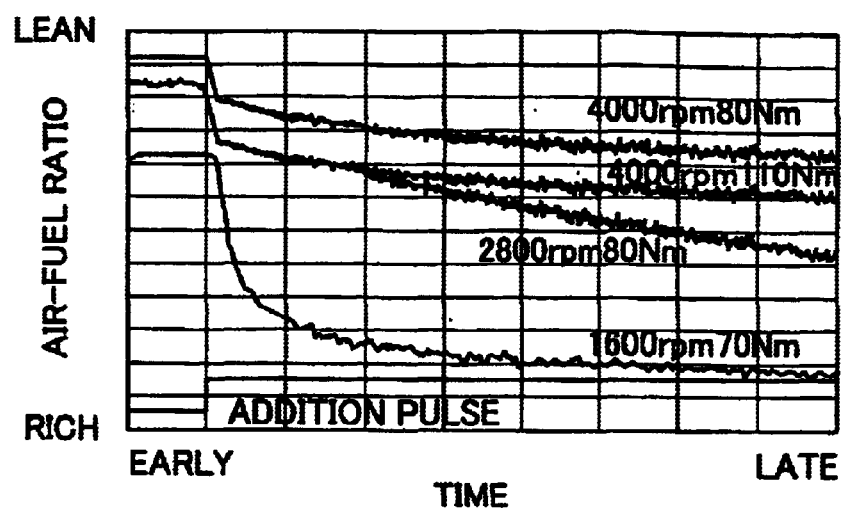
FIG. 6 is a schematic view showing a relationship between fuel leakage and air-fuel ratio A/F changes depending on an operational state of an engine.

The predetermined value A1 is available as data correlated to those values because of the following reasons. As shown in FIG. 5, the air-fuel ratio A/F shifts toward the lean side as the amount of fuel leakage from the addition agent supply unit 60 decreases. Even in the case where the amount of fuel leakage from the addition agent supply unit 60 is constant as shown in FIG. 6, the air-fuel ratio A/F changes depending on an operational state of the engine body 10. The reason for this is as follows. If the engine body 10 assumes a high-speed/high-load state, the amount of intake air sucked into the engine body 10 increases. Thus, as the amount of intake air increases, the amount of surplus oxygen increases and the air-fuel ratio A/F shifts toward the lean side. Accordingly, the predetermined value A1 is set as a leanest possible value in each of operational states.

If it is determined in S102 that the air-fuel ratio A/F is equal to or smaller than the predetermined value A1, the ECU 2 increases a count Ect of the counter by "1" (S103). The count Ect of the counter represents a measured period that starts when it is determined that the air-fuel ratio A/F is equal to or smaller than the predetermined value A1.

If it is determined in S102 that the air-fuel ratio A/F is larger than the predetermined value A1, the ECU 2 resets the count Ect of the counter as "0" (S104).

Figure 7:
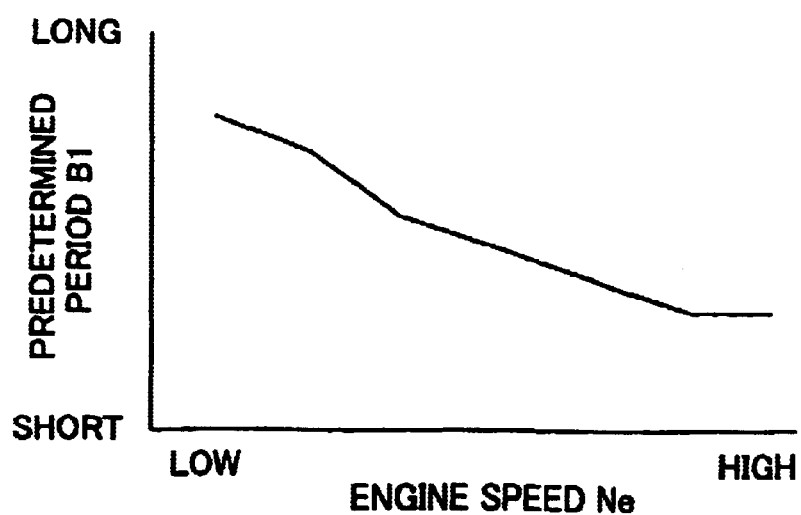
FIG. 7 is a schematic view of a relationship between speed of the engine body and a predetermined period B1.

If the count Ect of the counter is increased by "1" in S103, the ECU 2 determines whether or not the count Ect represents a period that is equal to or longer than the predetermined period B1 (S105). As shown in FIG. 7, the predetermined period B1 is recorded in the ROM of the ECU 2 as data correlated to the speed Ne of the engine body 10.

Figure 8:
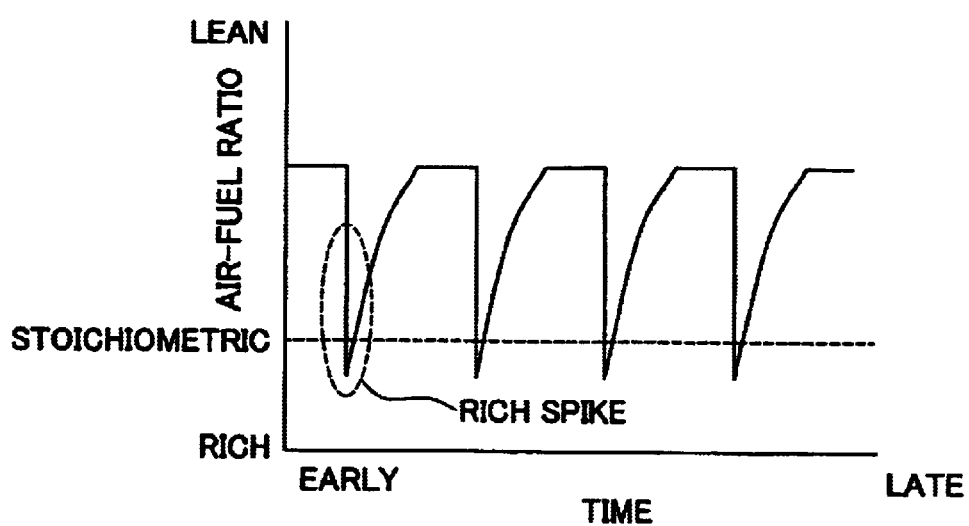
FIG. 8 is a schematic view showing how air-fuel ratio of exhaust gas changes in accordance with the lapse of time and showing how air-fuel ratio changes in the case where rich spike is carried out by the addition agent supply unit.

The predetermined period B1 is available as data correlated to the speed Ne of the engine body 10 because of the following reasons. In the case where the engine body 10 shifts in operational state, the air-fuel ratio A/F of exhaust gas in the vicinity of the A/F sensor 4 changes with delay with respect to a shift in operational state of the engine body 10. Thus, the air-fuel ratio A/F gently changes. Further, since NOx need to be reduced by the NOx occlusion-reduction catalyst 51, fuel is added to exhaust gas from the addition injector 62 of the addition agent supply unit 60 by means of rich spike as shown in FIG. 8. Accordingly, the predetermined period B1 is set with a view to determining whether changes in the air-fuel ratio A/F occur continuously due to fuel leakage from the addition agent supply unit 60 or occur transiently due to a shift in operational state or rich spike. A delay in changes in the air-fuel ratio A/F increases as the speed Ne of the engine body 10 decreases. Hence, as the speed Ne of the engine body 10 decreases, the predetermined period B1 is prolonged as shown in FIG. 7.

If it is determined in S105 that the count Ect of the counter represents a period that is equal to or longer than the predetermined period B1, the ECU 2 turns a leakage detection flag Exo on, that is, establishes an equation: Exo=1 (S106). That is, the ECU 2 determines that an abnormality has occurred in the addition agent supply unit 60.

If it is determined in S102 that the air-fuel ratio A/F is equal to or smaller than the predetermined value A1, if it is determined in S104 that the count Ect of the counter has been reset, if it is determined in S105 that the count Ect of the counter represents a period that is shorter than the predetermined period B1, or if the leakage detection flag Exo is turned on in S106, the ECU 2 determines whether or not the leakage detection flag Exo has been turned on, that is, whether or not Exo=1 (S107). If it is determined that the leakage detection flag Exo has not been turned on, the ECU 2 returns to S101 and the above-mentioned processings are repeatedly performed.

If it is determined in S107 that the leakage detection flag has been turned on, the ECU 2 determines that the addition agent supply unit 60 is abnormal and turns the warning lamp 7 on (S108). The ECU 2 thereby warns a driver of the occurrence of an abnormality in the addition agent supply unit 60 of the diesel engine system 1.

Upon turning the warning lamp 7 on, the ECU 2 restricts an accelerator opening to a value that is smaller than a predetermined value C1 (S109). The ECU 2 thereby reduces the amount Q of fuel injection into the cylinders of the engine body 10 from the injectors 11 as shown in FIG. 9, and restricts an operational state of the engine body 10 to a low-speed/low-load state.

Furthermore, the ECU 2 sets an opening of the intake throttle valve 23 as a predetermined value D1 and fully opens the EGR valve 42 (S110). The ECU 2 thereby increases an amount of EGR gas recirculated to intake air and performs control so that air-fuel ratios in combustion chambers become close to a stoichiometric air-fuel ratio. That is, the amount of surplus oxygen contained in exhaust gas becomes almost zero. As a result, fuel combustion in the exhaust gas purification unit 50 and a rise in temperature of the exhaust gas purification unit 50 resulting from fuel combustion are suppressed.

In S108 to S110, the ECU 2 makes the driver aware of the abnormality of the addition agent supply unit 60, and maintains the engine body 10 in an operational state that allows the vehicle equipped with the diesel engine system 1 to be pulled over. Thus, the driver can safely stop the vehicle without causing a deterioration in performance of the exhaust gas purification unit 50.

Figure 9:
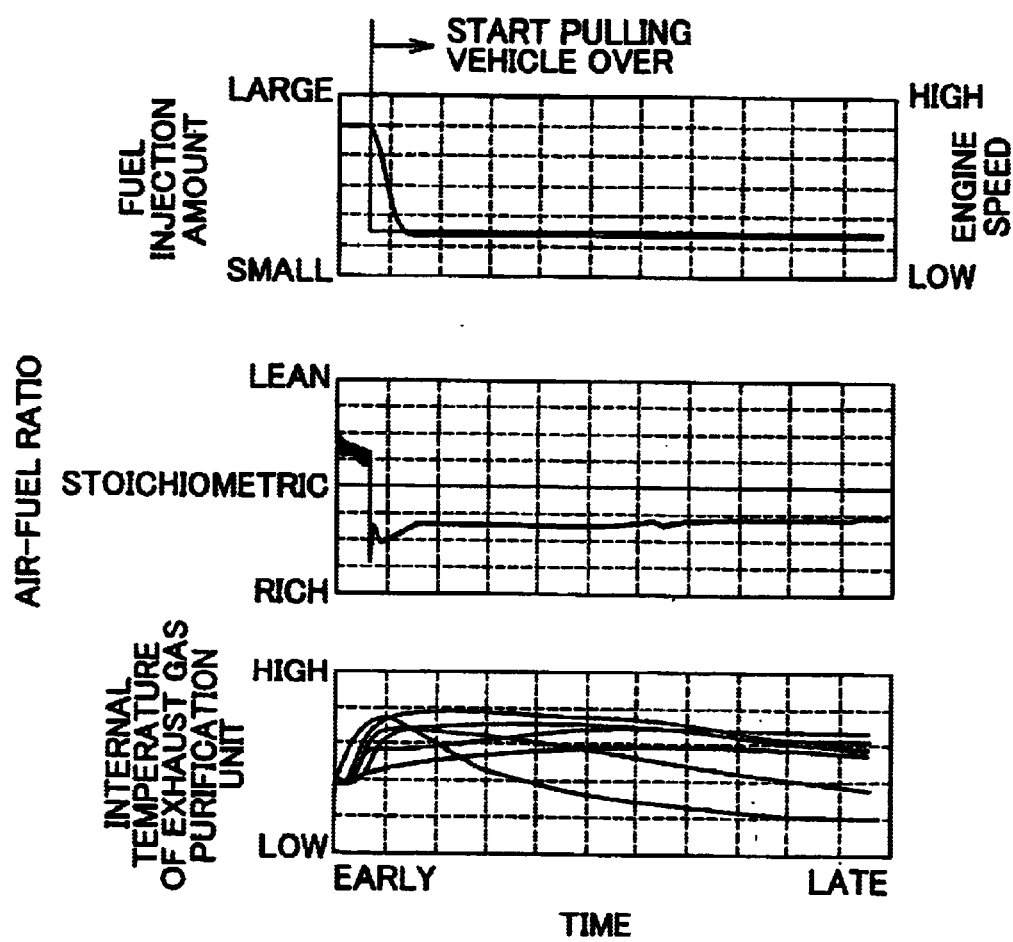
FIG. 9 is a schematic view showing how fuel injection amount, speed of the engine body, air-fuel ratio, and internal temperature of the exhaust gas purification unit change through operation of the diesel engine system to which the control device in accordance with the first embodiment of the invention is applied.

In the first embodiment, if an abnormality is detected due to fuel leakage from the addition agent supply unit 60, the temperature of the exhaust gas purification unit 50 temporarily rises as shown in FIG. 9. However, the temperature of the exhaust gas purification unit 50 is lowered by maintaining the engine body 10 in a low-speed/low-load state after detection of the abnormality. Thus, the exhaust gas purification unit 50 is prevented well in advance from deteriorating in performance as a result of a rise in temperature.

In the first embodiment, it is possible to detect an abnormality of the addition agent supply unit 60 from an air-fuel ratio of exhaust gas. If an abnormality of the addition agent supply unit 60 is detected, the ECU 2 turns the warning lamp 7 on, thus making the driver aware of the abnormality of the addition agent supply unit 60 and urging the driver to pull the vehicle over. At the same time, the ECU 2 restricts an operational state of the engine body 10 to a state allowing the vehicle to be pulled over. Thus, it is possible to prevent a deterioration in performance of the exhaust gas purification unit 50 well in advance.

(Second Embodiment)

The diesel engine system in accordance with the second embodiment of the invention will be described. The construction of the diesel engine system in accordance with the second embodiment is the same as that of the first embodiment and thus will not be described hereinafter.

Figure 10:
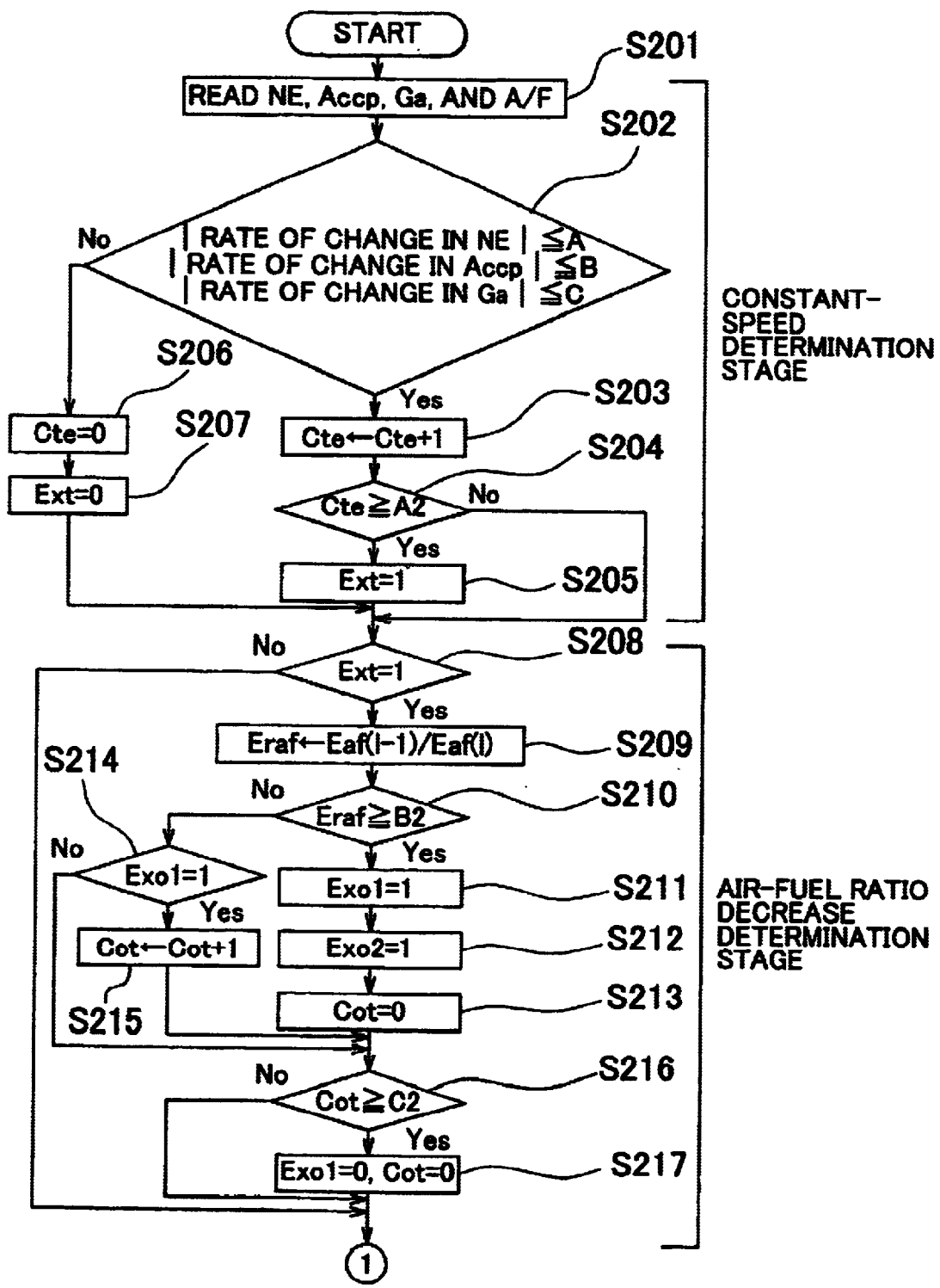
FIG. 10 is a flowchart showing operational flow of a diesel engine system to which a control device in accordance with a second embodiment of the invention is applied and showing a constant-speed determination stage and an air-fuel ratio decrease determination stage.
Figure 11:
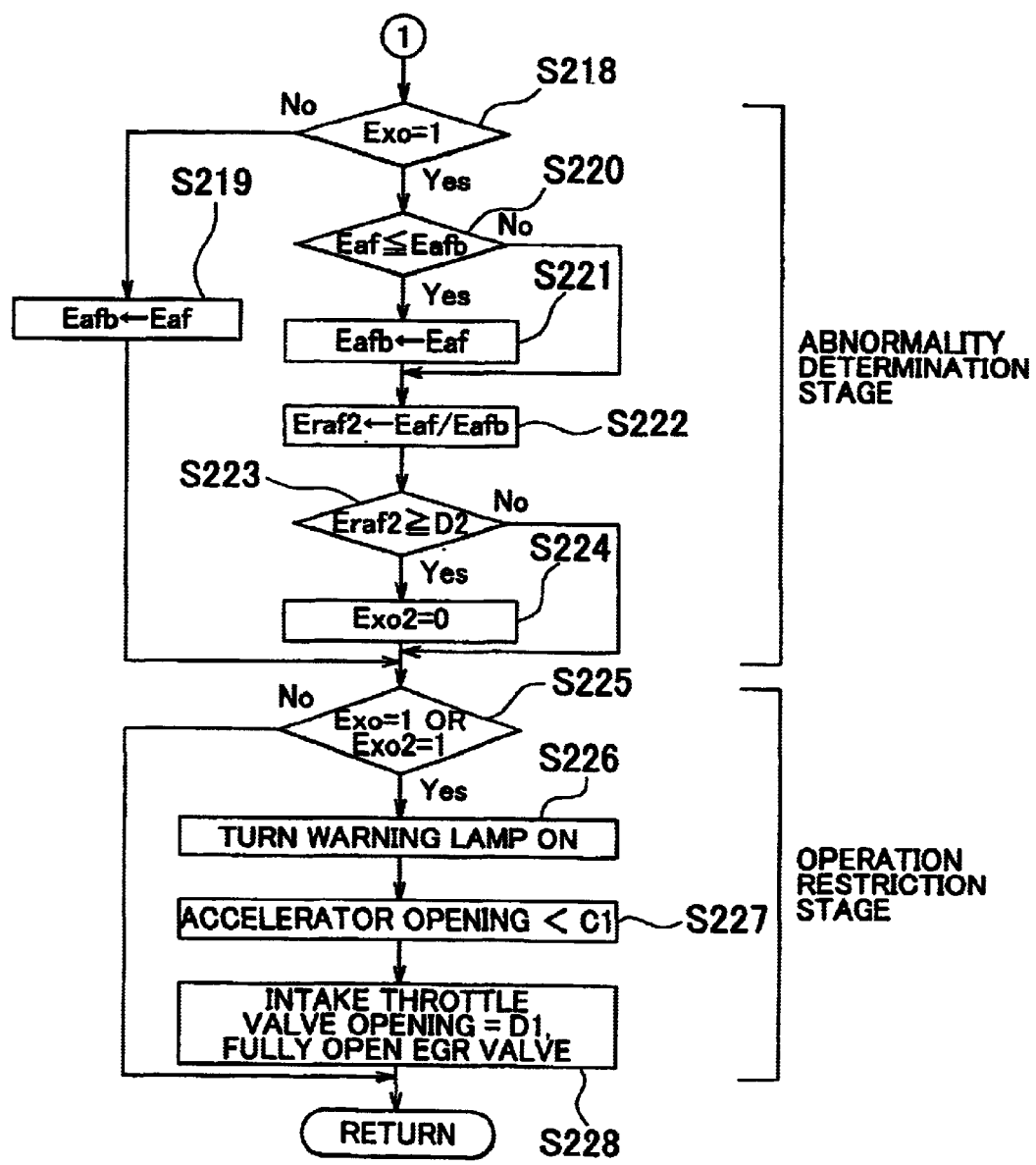
FIG. 11 is a flowchart showing operational flow of a diesel engine system to which the control device in accordance with the second embodiment of the invention is applied and showing an abnormality determination stage and an operation restriction stage that follows the flow shown in FIG. 10.
Figure 12:
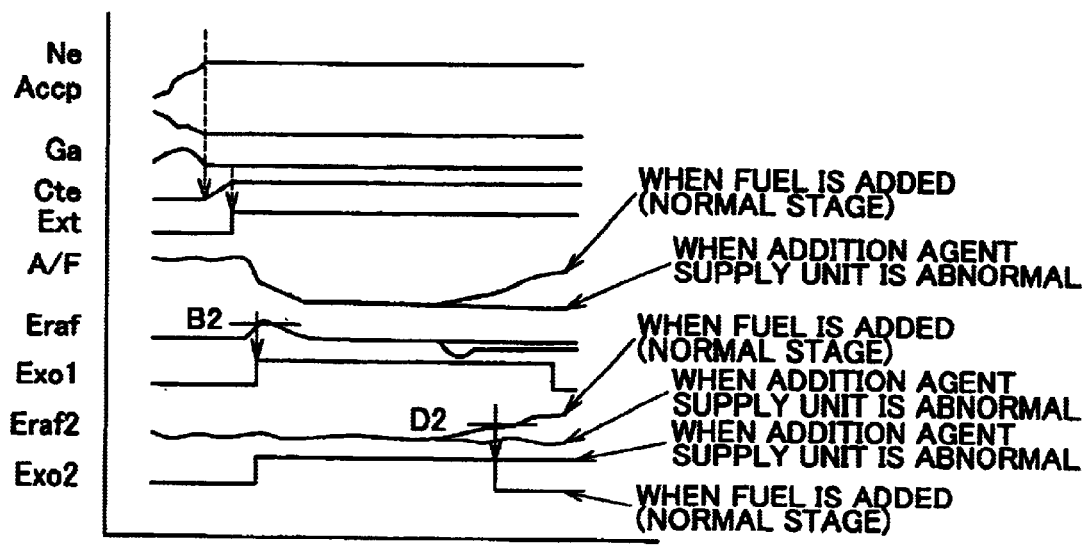
FIG. 12 is a schematic view of an operational time chart of the diesel engine system to which the control device in accordance with the second embodiment of the invention is applied.

FIGS. 10 and 11 show the flow of processings performed in accordance with the second embodiment. FIG. 12 shows a time chart of the processings performed in accordance with the second embodiment. The processings shown in FIGS. 10 and 11 are performed at intervals of a predetermined sampling time. Every time the processings are performed once, a count of the counter of the ECU 2 is increased by "1". In the second embodiment, there are four major processings, namely, a constant-speed determination stage for making determination on a constant-speed state of the engine body 10, an air-fuel ratio decrease determination stage for determining whether or not a rate of change in a decrease in the air-fuel ratio A/F is equal to or smaller than a predetermined value, an abnormality determination stage for making determination on an abnormality of the addition agent supply unit 60, and an operation restriction stage for restricting operation of the engine body 10.

(Constant-Speed Determination Stage)

The ECU 2 reads an A/F signal from the A/F sensor 4, an engine speed signal from the engine speed sensor 5, an accelerator opening signal from the accelerator opening sensor 6, and an intake air amount signal from the air flow meter 26 at intervals of a predetermined period (S201). The ECU 2 detects an air-fuel ratio A/F, an engine speed Ne, an accelerator opening Accp, and an intake air amount Ga from the read A/F signal, the read engine speed signal, the read accelerator opening signal, and the read intake air amount signal respectively.

The ECU 2 determines by comparison whether or not each of rates of change in the engine speed Ne, the accelerator opening Accp, and the intake air amount Ga that have been detected in S201 is equal to or smaller than a corresponding one of predetermined values set in advance (S202). More specifically, the ECU 2 compares the engine speed Ne, the accelerator opening Accp, and the intake air amount Ga that have been detected in the present routine with an engine speed, an accelerator opening, and an intake air amount that have been detected in the last routine, respectively. The ECU 2 then determines whether or not a rate of change in the engine speed Ne is equal to or smaller than a predetermined value A set in advance, whether or not a rate of change in the accelerator opening Accp is equal to or smaller than a predetermined value B set in advance, and whether or not a rate of change in the intake air amount Ga is equal to or smaller than a predetermined value C set in advance. The ECU 2 determines, on the basis of the rates of change in the engine speed, the accelerator opening, and the intake air amount, whether or not the engine body 10 is in a constant-speed operational state.

If it is determined in S202 that the rate of change in the engine speed Ne is equal to or smaller than the predetermined value A, that the rate of change in the accelerator opening is equal to or smaller than the predetermined value B, and that the rate of change in the intake air amount Ga is equal to or smaller than the predetermined value C, the ECU 2 determines that the engine body 10 is in a constant-speed state and increases a count Cte of the counter by "1" (S203). The count Cte of the counter represents a period that starts as soon as the engine body assumes a constant-speed operational state.

If the count Cte of the counter is increased by "1" in S203, the ECU 2 determines whether or not the count Cte of the counter represents a period that is equal to or longer than a predetermined period A2 (S204). That is, the ECU 2 determines whether or not the engine body 10 is in a stable state, that is, a constant-speed operational state.

If it is determined in S204 that the count Cte of the counter is equal to or larger than the predetermined value A2, the ECU 2 turns a constant-speed determination flag Ext on, that is, establishes an equation: Ext=1 (S205). That is, the ECU 2 determines that the engine body 10 is in a stable state, that is, in a constant-speed operational state.

If it is determined in S204 that the count Cte of the counter is smaller than the predetermined value A2, the ECU 2 proceeds to the subsequent processings in the air-fuel ratio decrease determination stage without turning the constant-speed determination flag Ext on. If it is determined in S202 that one of the rate of change in the engine speed Ne, the rate of change in the accelerator opening, and the rate of change in the intake air amount Ga is larger than a corresponding one of the predetermined values, the ECU 2 sets the count Cte of the counter as "0" (S206), sets the constant-speed determination flag Ext as "0" (S207), and proceeds to the processings in the air-fuel ratio decrease determination stage.

(Air-Fuel Ratio Decrease Determination Stage)

If the processings in the constant-speed state determination stage in the above-mentioned steps S201 to S207 are performed, the ECU 2 determines whether or not the constant-speed determination flag Ext has been turned on, that is, whether or not Ext=1 (S208). If it is determined that the constant-speed determination flag Ext has not been turned on, the ECU 2 proceeds to the subsequent processings in the abnormality determination stage without performing the processings in the air-fuel ratio decrease determination stage.

If it is determined in S208 that the constant-speed determination flag Ext has been turned on, the ECU 2 calculates a rate Eraf of change in air-fuel ratio (S209). The rate Eraf of change in air-fuel ratio is calculated using an equation (1) shown below. That is, the rate Eraf of change is calculated as a ratio of an air-fuel ratio detected in the last routine to an air-fuel ratio detected in the present routine.

$$Eraf=\text{(last air-fuel ratio } A/F)/(\text{present air-fuel ratio } A/F) \quad (1)$$

If the rate Eraf of change in air-fuel ratio is calculated, the ECU 2 determines whether or not the calculated rate Eraf of change in air-fuel ratio is equal to or larger than a predetermined value B2 (S210). As described above, the rate Eraf of change in air-fuel ratio is a ratio of the air-fuel ratio in the last routine to the air-fuel ratio in the present routine. Therefore, if the rate Eraf of change in air-fuel ratio has become equal to or larger than the predetermined value B2, it is concluded that the air-fuel ratio has decreased. Accordingly, the rate Eraf of change in air-fuel ratio represents a rate at which the air-fuel ratio decreases.

Figure 13:
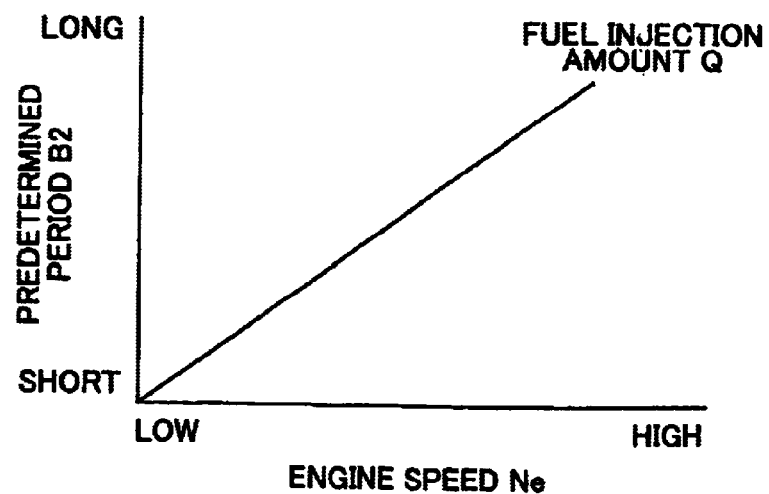
FIG. 13 is a schematic view showing how speed of the engine body, fuel injection amount, and a predetermined period B2 are related to one another.

As shown in FIG. 13, the predetermined value B2 is recorded in the ROM of the ECU 2 as data correlated to the speed Ne of the engine body 10 and the amount Q of fuel injection from the injectors 11.

The predetermined value B2 is available as data correlated to those values because of the following reasons. As shown in FIGS. 5 and 6 in the first embodiment, the rate Eraf of change during fuel leakage differs depending on fuel leakage from the addition agent supply unit 60 and an operational state of the engine body 10. That is, the rate Eraf of change in air-fuel ratio increases as the amount of fuel leakage from the addition agent supply unit 60 increases, and the rate Eraf of change in air-fuel ratio increases as the operational state of the engine body 10 shifts toward the low-speed/low load side. As in the case of the first embodiment, the fuel injection amount Q is calculated on the basis of the speed of the engine body 10, the accelerator opening Accp, and values output from the other sensors.

If it is determined in S210 that the rate Eraf of change in air-fuel ratio is equal to or larger than the predetermined value B2, the ECU 2 turns a first air-fuel ratio decrease determination flag Exo1 on, that is, establishes an equation: Exo1=1 (S211), and turns a second air-fuel ratio decrease determination flag Exo2 on, that is, establishes an equation: Exo2=1 (S212). That is, the ECU 2 determines that the rate Eraf of change has become equal to or larger than the predetermined value B2 while the air-fuel ratio A/F decreases. Furthermore, the ECU 2 resets a count Cot of an air-fuel ratio decrease detection counter, that is, sets the count Cot as "0" (S213).

If it is determined in S210 that the rate Eraf of change in air-fuel ratio is smaller than the predetermined value B2, the ECU 2 determines whether or not the first air-fuel ratio decrease determination flag Exo1 has been turned on, that is, Exo1=1 since the execution of a routine prior to the last routine (S214). If it is determined in S214 that the first air-fuel ratio decrease determination flag Exo1 has been turned on, the count Cot of the air-fuel ratio decrease detection counter is increased by "1" (S215).

After the above-mentioned processings, the ECU 2 determines whether or not the count Cot of the air-fuel ratio detection counter represents a period that is equal to or longer than a predetermined period C2 (S216). The predetermined period C2 is set to ensure a certain period after the rate Eraf of change in air-fuel ratio has become equal to or larger than the predetermined value B2. As shown in FIG. 8 in the first embodiment, fuel is added to exhaust gas from the addition injector 62 of the addition agent supply unit 60 through rich spike so as to cause the exhaust gas purification unit 50 to function. Thus, the predetermined period C2 is set so as to determine whether changes in air-fuel ratio occur continuously due to fuel leakage from the addition agent supply unit 60 or occur transiently due to rich spike.

If it is determined in S216 that the count Cot of the air-fuel ratio detection counter represents a period that is equal to or longer than the predetermined period C2, the first air-fuel ratio decrease determination flag Exo1 is turned off (i.e., Exo1=0) and the count Cot of the air-fuel ratio decrease detection counter is reset (i.e., Cot=0) (S217). The ECU 2 then proceeds to the processings in the abnormality determination stage. If it is determined in S216 that the counter Cot of the air-fuel ratio detection counter is smaller than C2, the ECU 2 proceeds to the processings in the abnormality determination stage without turning the first air-fuel ratio decrease determination flag Exo1 off or resetting the count Cot of the air-fuel ratio decrease detection counter.

(Abnormality Determination Stage)

If the above-mentioned processings in the air-fuel ratio decrease determination stage are performed, the ECU 2 determines whether or not the first air-fuel ratio decrease determination flag Exo1 has been turned on, that is, whether or not Exo1=1 (S218).

If it is determined in S218 that the first air-fuel ratio decrease determination flag Exo1 has been turned on, the ECU 2 determines whether or not an air-fuel ratio Eaf detected in the present routine is equal to or smaller than a minimum value Eafb of air-fuel ratios detected in previous routines (S220). If it is determined in S220 that the air-fuel ratio Eaf detected in the present routine is equal to or smaller than the minimum value Eafb, the ECU 2 records the air-fuel ratio Eaf detected in the present routine into the RAM as a minimum value (S221).

If it is determined in S220 that the air-fuel ratio Eaf detected in the present routine is larger than the minimum value Eafb or if the processing in S221 is performed, the ECU 2 calculates a rate Eraf2 of change (S222). The rate Eraf2 of change is calculated using an equation (2) shown below. The rate Eraf2 of change is a ratio of the air-fuel ratio Eaf detected this time to the minimum value Eafb of the previously detected air-fuel ratios.

$$Eraf2=Eaf/Eafb \quad (2)$$

If the rate Eraf2 of change is calculated in S222, the ECU 2 determines whether or not the calculated rate Eraf2 of change is equal to or larger than a predetermined value D2 (S223). As in the case of the determination made in S216, there are some cases where the air-fuel ratio A/F of exhaust gas temporarily shifts toward the rich side due to the addition of fuel through rich spike as shown in FIG. 8. Thus, the predetermined value D2 is set so as to determine whether changes in air-fuel ratio occur continuously due to fuel leakage from the addition agent supply unit 60 or occur transiently due to rich spike.

If it is determined in S223 that the rate Eraf2 of change is equal to or larger than the predetermined value D2, the ECU 2 turns the second air-fuel ratio decrease determination flag Exo2 turned on in S212 off, that is, establishes an equation: Exo2=0 (S224). That is, if the rate Eraf2 is equal to or larger than the predetermined value D2, the air-fuel ratio of exhaust gas tends to shift toward the lean side. The ECU 2 then determines that there is no continuous fuel leakage from the addition agent supply unit 60.

If it is determined in S218 that the first air-fuel ratio decrease determination flag Exo1 has been turned off, the ECU 2 records the air-fuel ratio Eaf detected in the present routine into the RAM as the minimum value Eafb.

(Operation Restriction Stage)

If the above-mentioned processings in the abnormality determination stage are performed, the ECU 2 determines whether or not both the first air-fuel ratio decrease determination flag Exo1 and the second air-fuel ratio decrease determination flag Exo2 have been turned on, that is, whether or not Exo1=1 and Exo2=1 (S225). If it is determined that both the first air-fuel ratio decrease determination flag Exo1 and the second air-fuel ratio decrease determination flag Exo2 have been turned on, the ECU 2 determines that an abnormality has occurred in the addition agent supply unit 60.

The processings performed in S226 to S228 in the operation restriction stage are the same as those performed in S108 to S110 in the first embodiment and thus will not be described hereinafter.

If it is determined in S225 that the first air-fuel ratio decrease determination flag Exo1 or the second air-fuel ratio decrease determination flag Exo2 has been turned off, the ECU 2 returns to the processings in the constant-speed determination stage without performing the processings in the operation restriction stage.

In the second embodiment as well, it is possible to detect an abnormality of the addition agent supply unit 60 from an air-fuel ratio of exhaust gas. If an abnormality of the addition agent supply unit 60 is detected, the ECU 2 turns the warning lamp 7 on, thus making the driver aware of the abnormality of the addition agent supply unit 60 and urging the driver to pull the vehicle over. At the same time, the ECU 2 restricts an operational state of the engine body 10 to a state that allows the vehicle to be pulled over. Thus, the exhaust gas purification unit 50 can be prevented well in advance from deteriorating in performance as a result of a rise in temperature.

(Third Embodiment)

The diesel engine system in accordance with the third embodiment of the invention will be described. The construction of the diesel engine system in accordance with the third embodiment is the same as that of the first embodiment and thus will not be described hereinafter.

Figure 14:
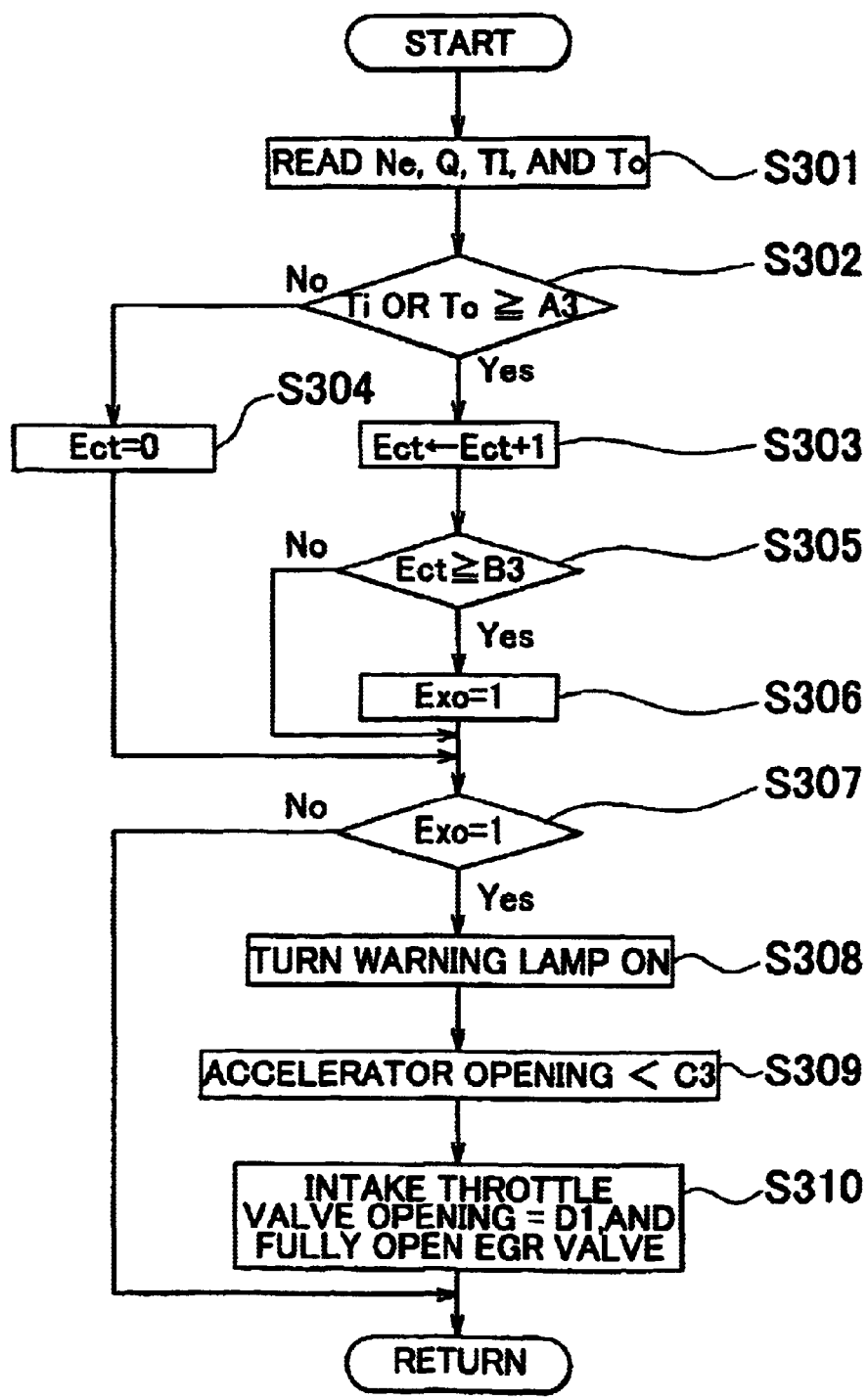
FIG. 14 is a flowchart showing operational flow of a diesel engine system to which a control device in accordance with a third embodiment of the invention is applied.
Figure 15:
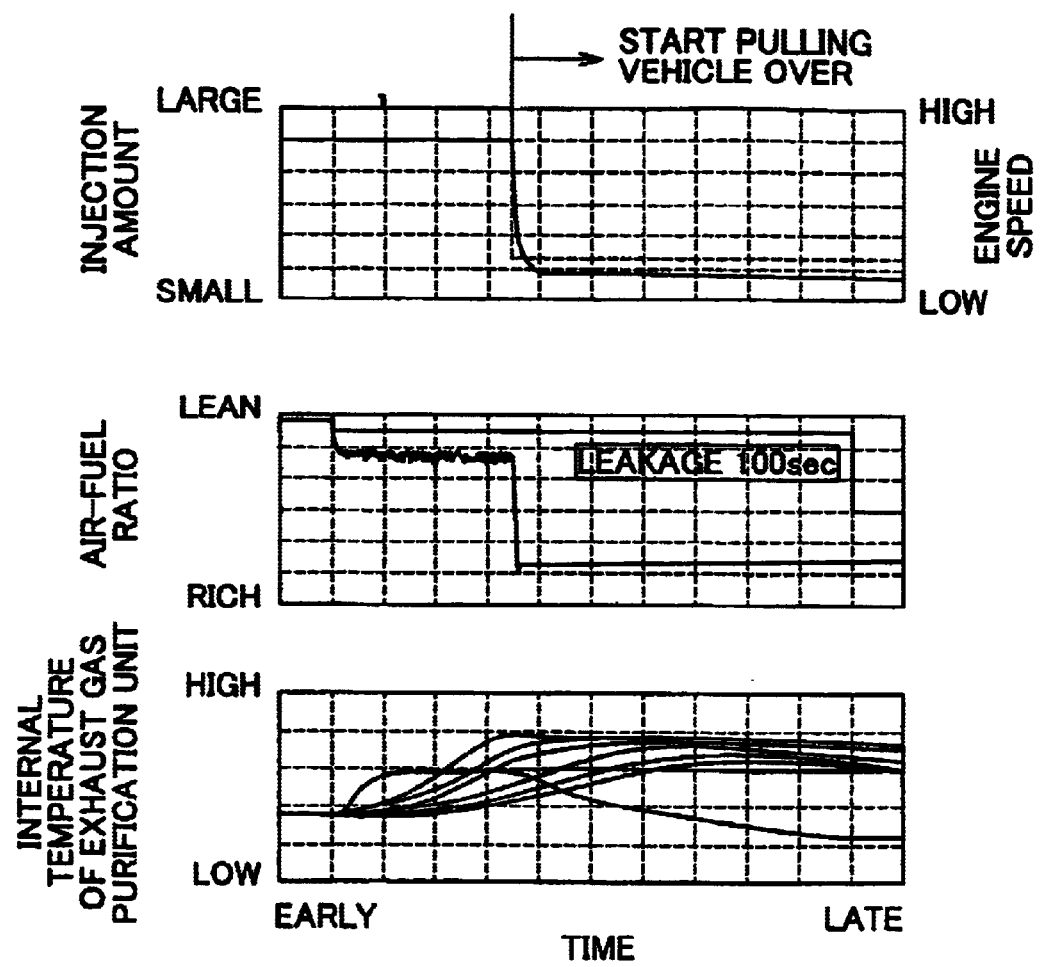
FIG. 15 is a schematic view showing how fuel injection amount, speed of the engine body, air-fuel ratio, and internal temperature of the exhaust gas purification unit change through operation of the diesel engine system to which the control device in accordance with the third embodiment of the invention is applied.

FIG. 14 shows the flow of processings performed in accordance with the third embodiment. The processings shown in FIG. 14 are performed at intervals of a predetermined sampling time. Every time the processings are performed once, a count of the counter of the ECU 2 is increased by "1". In the third embodiment, an abnormality of the addition agent supply unit 60 is detected on the basis of a temperature of the exhaust gas purification unit. 50. That is, if the air-fuel ratio of exhaust gas shifts toward the rich side due to fuel leakage from the addition agent supply unit 60, the temperature of the exhaust gas purification unit 50 rises through fuel combustion therein. Thus, it becomes possible to make determination on an abnormality of the addition agent supply unit 60 by detecting a temperature of the exhaust gas purification unit 50.

The ECU 2 reads an internal temperature signal from the exhaust gas temperature sensor 53, an outlet temperature signal from the exhaust gas temperature sensor 54, an engine speed signal from the engine speed sensor 5, and an amount Q of fuel injection from the injectors 11 (S301). The fuel injection amount Q is calculated on the basis of values output from the other sensors. The ECU 2 detects an internal temperature Ti, an outlet temperature To, and an engine speed Ne from the read internal temperature signal, the read outlet temperature signal, and the read engine speed signal, respectively.

The ECU 2 determines whether or not the detected internal temperature Ti or the outlet temperature To is equal to or higher than a predetermined value A3 (S302). The predetermined value A3 is set as a relatively high temperature that cannot be reached in a practical operational state of the engine body 10.

If it is determined in S302 that the internal temperature Ti or the outlet temperature To is equal to or higher than the predetermined value A3, the ECU 2 increases a count Ect of the counter by "1" (S303). The count Ect of the counter represents a period that starts as soon as it is determined that the internal temperature Ti or the outlet temperature To is equal to or higher than the predetermined value A3.

If it is determined in S302 that the internal temperature Ti or the outlet temperature To is lower than the predetermined value A3, the ECU 2 resets the count Ect of the counter as "0" (S304).

If the count Ect of the counter is increased by "1" in S303, the ECU 2 determines whether or not the count Ect of the counter represents a period that is equal to or longer than a predetermined period B3 (S305). In consideration of the fact that a value output from the exhaust gas temperature sensor 53 or the exhaust gas temperature sensor 54 temporarily shifts toward the high-temperature side, for example, due to electrical noise, the predetermined period B3 is set so as to reduce the influence of the noise. Because the predetermined value A3 is set relatively high in S302, it is desirable the predetermined period B3 be reduced to a shortest possible period. This is because of the purpose of preventing the exhaust gas purification unit 50 from suffering a malfunction as a result of continuation of a raised temperature of the exhaust gas purification unit 50.

If it is determined in S305 that the count Ect of the counter represents a period that is equal to or longer than the predetermined period B3, the ECU 2 turns the leakage detection flag Exo on, that is, establishes an equation: Exo=1 (S306). That is, the ECU 2 determines that an abnormality has occurred in the addition agent supply unit 60.

If the count Ect is reset because it is determined in S302 that the internal temperature Ti or the outlet temperature To is lower than the predetermined value A, if it is determined in S305 that the count Ect of the counter represents a period shorter than the predetermined period B3, or if the leakage detection flag Exo is turned on in S306, the ECU 2 determines whether or not the leakage detection flag Exo has been turned on, that is, whether or not Exo=1 (S307). If it is determined that the leakage detection flag Exo has not been turned on, the ECU 2 returns to S301 and the above-mentioned processings are performed again.

If it is determined in S307 that the leakage detection flag has been turned on, the ECU 2 determines that the addition agent supply unit 60 is abnormal. The subsequent processings performed in S308 to S310 are the same as those performed in S108 to S110 in the first embodiment and thus will not be described hereinafter.

As a result of the above-mentioned processings, the temperature of the exhaust gas purification unit 50 temporarily rises. However, the temperature of the exhaust gas purification unit 50 can be inhibited from rising by shifting the vehicle to a pull-over mode upon detection of an abnormality of the addition agent supply unit 60.

Figure 16:
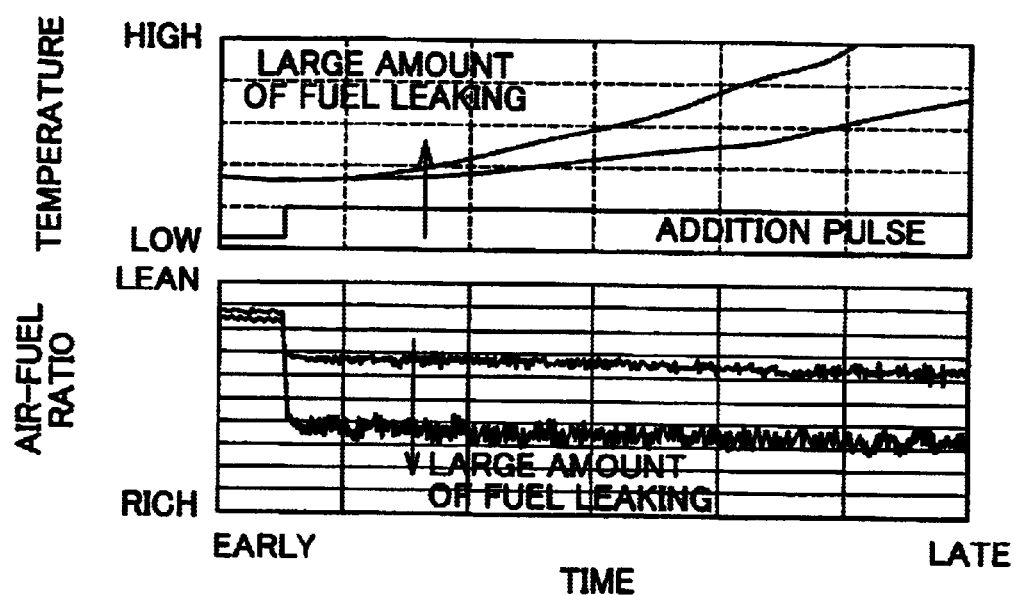
FIG. 16 is a schematic view showing how a relationship between fuel leakage from the addition agent supply unit and temperature of the exhaust gas purification unit and a relationship between fuel leakage from the addition agent supply unit and air-fuel ratio change in accordance with the lapse of time.

As shown in FIG. 16, even in the case where the amount of fuel leakage from the addition agent supply unit 60 is small, although the exhaust gas purification unit 50 reaches a high temperature, the amount of change in the air-fuel ratio A/F toward the rich side in the case of fuel leakage decreases. Thus, in the case where fuel leakage is detected using an air-fuel ratio obtained from the A/F sensor 4 as in the case of the first embodiment, it is impossible to detect fuel leakage if the air-fuel ratio is smaller than the predetermined value A1. In the second embodiment, even in the case where fuel leakage is detected using the rate Eraf of change in air-fuel ratio, it is impossible to detect fuel leakage if the rate. Eraf of change is smaller than the predetermined value B2.

In the third embodiment, it is determined on the basis of a temperature of the exhaust gas purification unit 50 whether or not there is an abnormality in the addition agent supply unit 60, whereby it becomes possible to detect a negligible amount of fuel that leaks from the addition agent supply unit and that cannot be easily detected on the basis of an exhaust gas air-fuel ratio A/F obtained from the A/F sensor 4. Thus, according to the third embodiment, even if the amount of fuel leakage from the addition agent supply unit 60 is small, the fuel leakage can be reliably detected.

(Fourth Embodiment)

The diesel engine system in accordance with the fourth embodiment of the invention will be described. The construction of the diesel engine system in accordance with the fourth embodiment is the same as that of the first embodiment and thus will not be described hereinafter.

Figure 17:
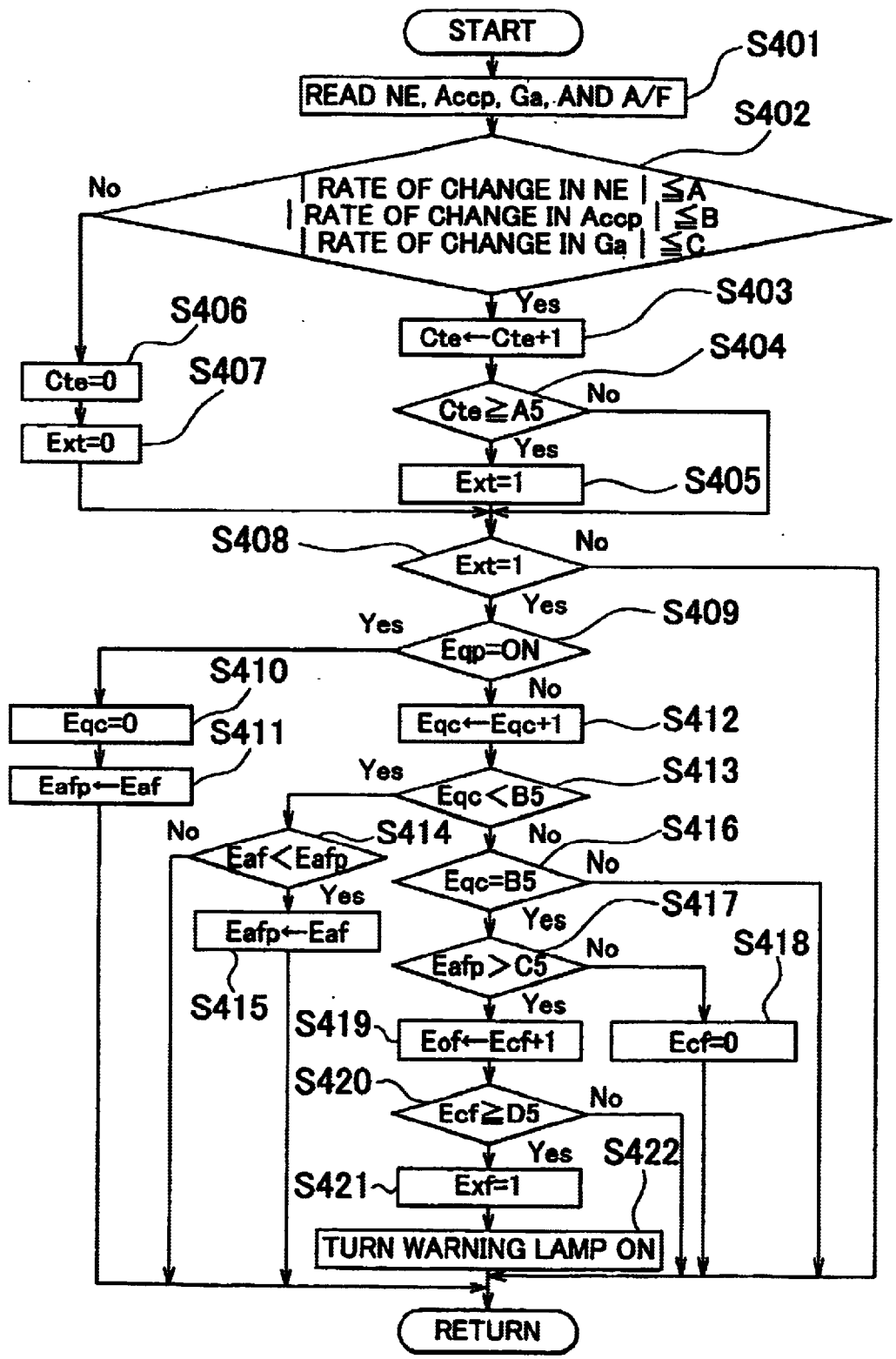
FIG. 17 is a flowchart showing operational flow of a diesel engine system to which a control device in accordance with a fourth embodiment of the invention is applied.
Figure 18:
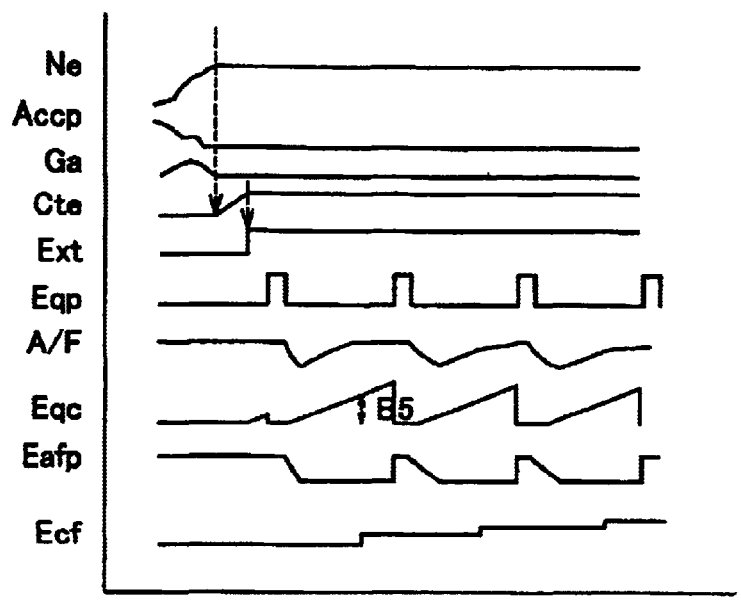
FIG. 18 is a schematic view of an operational time chart of the diesel engine system to which the control device in accordance with the fourth embodiment of the invention is applied.

FIG. 17 shows the flow of processings performed in accordance with the fourth embodiment. FIG. 18 is a time chart of the processings performed in accordance with the fourth embodiment. The processings shown in FIG. 17 are performed at intervals of a predetermined sampling time. Every time the processings are performed once, a count of the counter of the ECU 2 is increased by "1". In the fourth embodiment, there are two major processings, namely, a constant-speed determination stage for making determination on a constant-speed state of the engine body 10 and an implementation state determination stage for making determination on a state of rich spike implemented by the addition agent supply unit 60.

In the fourth embodiment, unlike the first to third embodiments, determination on an abnormality of the addition agent supply unit 60 such as insufficient addition of fuel to exhaust gas resulting from clogging of the addition injector 62 or the like is made. In the fourth embodiment, it is detected whether or not the air-fuel ratio of exhaust gas has sufficiently shifted toward the rich side through rich spike that is implemented to cause the exhaust gas purification unit 50 to function, whereby determination on an abnormality of the addition agent supply unit 60 is made.

(Constant-Speed Determination Stage)

In the fourth embodiment, processings performed in S401 to S407 in the constant-speed determination stage are the same as those performed in the second embodiment and thus will not be described hereinafter.

(Implementation State Determination Stage)

If the processings in the constant-speed determination stage are performed, the ECU 2 determines whether or not the constant-speed determination flag Ext has been turned on in the constant-speed state determination stage, that is, whether or not Ext=1 (S408). If the constant-speed determination flag Ext has been turned on, the engine body 10 is in a stable state, that is, in a constant-speed operational state. If the constant-speed determination flag Ext has not been turned on, the ECU 2 returns to S401 and the processings in the constant-speed determination stage are performed again.

If it is determined in S408 that the constant-speed determination flag Ext has been turned on, the ECU 2 determines whether or not an addition command pulse Eqp in the addition agent supply unit 60 is on (S409). That is, the ECU 2 determines whether or not rich spike is being implemented by the addition agent supply unit 60.

If it is determined in S409 that the addition command pulse Eqp is off, the ECU 2 increases a count Eqc of an A/F minimum value detection counter by "1" (S412). That is, the count Eqc of the A/F minimum value detection counter represents a constant period that starts after implementation of rich spike.

Figure 19:
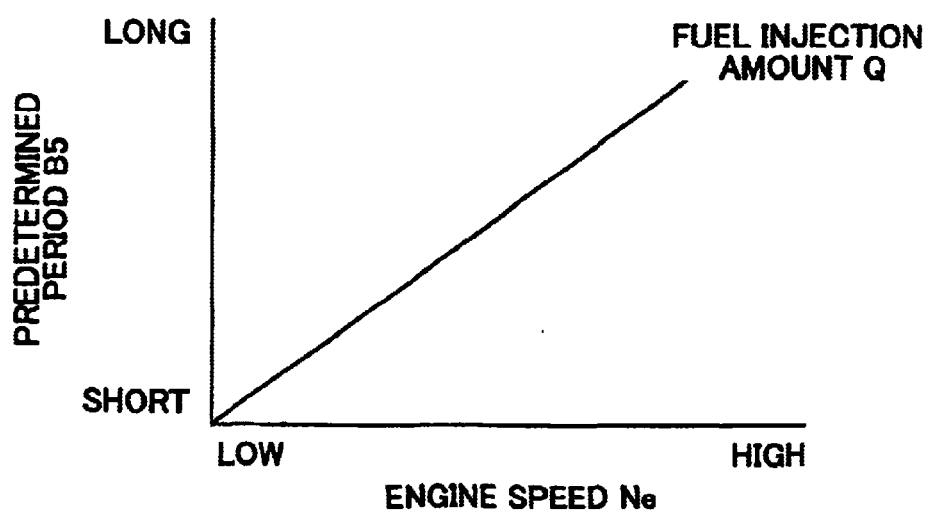
FIG. 19 is a schematic view showing how speed of the engine body, fuel injection amount, and a predetermined period B5 are related to one another.

If the count Eqc of the A/F minimum value detection counter is increased by "1" in S412, the ECU 2 determines whether or not the count Eqc of the A/F minimum value detection counter represents a period that is shorter than a predetermined period B5 (S413). The predetermined period B5 is set shorter than an interval of rich spike and longer than a period in which the peak of rich spike is detected. That is, a minimum value of the air-fuel ratio A/F resulting from rich spike is detected within the predetermined period B5. As shown in FIG. 19, the predetermined period B5 is recorded in the ROM of the ECU 2 as data correlated to the engine speed Ne and the amount Q of fuel injection from the injectors 11.

If it is determined in S413 that the count Eqc of the A/F minimum value detection counter represents a period that is equal to or longer than the predetermined period B5, the ECU 2 determines whether or not the count Eqc of the A/F minimum value detection counter represents the predetermined period B5 (S416).

If it is determined in S416 that the count Eqc of the A/F minimum value detection counter represents the predetermined period B5, the ECU 2 determines whether or not a minimum value Eapf of an exhaust gas air-fuel ratio detected by the A/F sensor 4 is equal to or larger than a predetermined value C5 (S417). The air-fuel ratio minimum value Eapf is an air-fuel ratio that has been minimized in the course of an increase in concentration of fuel contained in exhaust gas as a result of rich spike. If rich spike is implemented from the addition agent supply unit 60, the air-fuel ratio of exhaust gas shifts toward the rich side and reaches a value that is close to the stoichiometric air-fuel ratio or a value that is equal to or smaller than the stoichiometric air-fuel ratio. On the other hand, rich spike is implemented under various circumstances in which the air-fuel ratio changes in accordance with an operational state of the engine body 10. Thus, as shown in FIG. 20, the predetermined value C5 is recorded in the ROM of the ECU 2 as data correlated to the speed Ne of the engine body 10 and the amount Q of fuel injection from the injectors 11.

If it is determined in S416 that the air-fuel ratio minimum value Eafp is larger than C5, the ECU 2 determines that the peak of air-fuel ratio obtained as a result of rich spike has shifted toward the lean side with respect to a normal state. That is, the ECU 2 determines that the amount of fuel injection from the addition agent supply unit 60 is insufficient. Thus, the ECU 2 increases a count Ecf of an abnormality counter by "1" (S419).

If the count Ecf of the abnormality counter is increased by "1" in S419, the ECU 2 determines whether or not the count Ecf of the abnormality counter is equal to or larger than a predetermined number D5 of times (S240).

If it is determined in S420 that the counter Ecf of the abnormality counter is equal to or larger than the predetermined number D5 of times, it is concluded that rich spike continues to be insufficient. Thus, the ECU 2 determines that the addition agent supply unit 60 is abnormal and turns an abnormality flag Exf on, that is, establishes an equation: Exf=1 (S421).

If the abnormality flag Exf is turned on, the ECU 2 turns the warning lamp 7 on and makes a driver of the diesel engine system 1 aware of the abnormality of the addition agent supply unit 60 (S422).

If it is determined in S409 that the addition command pulse Eqp is on, the ECU 2 resets the count Eqc of the A/F minimum value detection counter, that is, establishes an equation: Eqc=0 (S410), and records an exhaust gas air-fuel ratio A/F detected in the present routine into the RAM as the air-fuel ratio minimum value Eafp (S411). The ECU 2 then returns to S401.

If it is determined in S413 that the count Eqc of the A/F minimum value detection counter is smaller than the predetermined value B5, the ECU 2 determined whether or not the exhaust gas air-fuel ratio Eaf detected in the present routine is smaller than an air-fuel ratio minimum value Eafp detected and recorded in a routine prior to the last routine (S414). If it is determined that the detected air-fuel ratio Eaf is smaller than the recorded minimum value Eafp, the ECU 2 updates and records the detected air-fuel ratio Eaf as a new minimum value Eafp (S415).

If it is determined that the detected air-fuel ratio Eaf is equal to or larger than the recorded minimum value Eafp or if the minimum value Eafp is updated in S415, the ECU 2 returns to S401.

If it is determined in S416 that the count Eqc of the A/F minimum value detection counter does not represent the predetermined value B5, namely, that the count Eqc of the A/F minimum value detection counter is larger than the predetermined value B5, the ECU 2 returns to S401.

If it is determined in S417 that the air-fuel ratio minimum value Eafp is equal to or smaller than the predetermined value C5, the ECU 2 resets the count Ecf of the abnormality counter, that is, establishes an equation: Ecf=0, and returns to S401.

In the fourth embodiment, if the injector 62 of the addition agent supply unit 60 is clogged, for example, due to unburnt components contained in exhaust gas, it is possible to detect an abnormality such as the insufficiency of fuel added to exhaust gas.

The embodiments of the invention described above handle examples in which the invention is applied to a diesel engine system equipped with a fuel injection system of common rail type. However, the invention is also applicable to other diesel engine systems, gasoline engine systems, and the like. It is not absolutely required that fuel used as a reducing agent be light oil. That is, liquefied gas fuels such as gasoline, LPG, and DME can also be used as a reducing agent.

Each of the above-mentioned embodiments handles an example in which the control device for the internal combustion engine in accordance with the invention is applied to a diesel engine system. However, it is also appropriate that the above-mentioned embodiments be combined to apply the invention to a diesel engine system.

What is claimed is:

1. A control device for an internal combustion engine, comprising:

exhaust gas purification means that is installed in an exhaust passage of the internal combustion engine and that purifies exhaust gas;

addition agent supply means that intermittently adds an addition agent to exhaust gas to purify exhaust gas by means of the exhaust gas purification means;

oxygen concentration detection means that detects an oxygen concentration of the exhaust gas; and abnormality determination means that determines, on the basis of an oxygen concentration detected by the oxygen concentration detection means, whether or not the addition agent supply means is abnormal, wherein the abnormality determination means determines that the addition agent supply means is abnormal if the oxygen concentration of the exhaust gas remains equal to or lower than a predetermined concentration for a predetermined period.

2. The control device according to claim 1, wherein the predetermined concentration is set in accordance with an operational state of the internal combustion engine.

3. The control device according to claim 1, wherein the predetermined period is set in accordance with an operational state of the internal combustion engine.

4. A control device for an internal combustion engine, comprising:

exhaust gas purification means that is installed in an exhaust passage of the internal combustion engine and that purifies exhaust gas;

addition agent supply means that intermittently adds an addition agent to exhaust gas to purify exhaust gas by means of the exhaust gas purification means;

oxygen concentration detection means that detects an oxygen concentration of the exhaust gas;

operational state detection means that detects an operational state of the internal combustion engine;

constant-speed operation determination means that determines, on the basis of an operational state detected by the operational state detection means, whether or not the internal combustion engine is in a constant-speed operational state; and abnormality determination means that determines, on the basis of an oxygen concentration detected by the oxygen concentration detection means, whether or not the addition agent supply means is abnormal, wherein if a rate of change in a decrease in oxygen concentration of the exhaust gas becomes equal to or larger than a first predetermined value when the constant-speed operation determination means determines that the internal combustion engine is in constant-speed operation, the abnormality determination means calculates a ratio between an oxygen concentration of the exhaust gas within a predetermined period from the time when the rate of change becomes equal to or larger than the first predetermined value and an oxygen concentration minimum value of the exhaust gas within the predetermined period, and wherein if the ratio is equal to or smaller than a second predetermined value, the abnormality determination means determines that the addition agent supply means is abnormal.

5. A control device for an internal combustion engine, comprising:

exhaust gas purification means that is installed in an exhaust passage of the internal combustion engine and that purifies exhaust gas;

addition agent supply means that intermittently adds an addition agent to exhaust gas to purify exhaust gas by means of the exhaust gas purification means;

temperature detection means that detects a temperature of the exhaust gas purification means; and abnormality determination means that determines, on the basis of a temperature of the exhaust gas purification means detected by the temperature detection means, whether or not the addition agent supply means is abnormal, wherein the abnormality determination means determines that the addition agent supply means is abnormal if the temperature of the exhaust gas purification means remains equal to or higher than a predetermined temperature for a predetermined period.

6. The control device according to claim 1, further comprising:

operational state restriction means that restricts an operational state of the internal combustion engine if the abnormality determination means determines that the addition agent supply means is abnormal; and abnormality display means that displays an abnormality of the addition agent supply means if the abnormality determination means determines that the addition agent supply means is abnormal.

7. The control device according to claim 6, wherein the operational state restriction means restricts the internal combustion engine to a low-speed/low-load operational state and reduces an oxygen concentration of the exhaust gas.

8. A control device for an internal combustion engine, comprising:

exhaust gas purification means that is installed in an exhaust passage of the internal combustion engine and that purifies exhaust gas;

addition agent supply means that intermittently adds an addition agent to exhaust gas to purify exhaust gas by means of the exhaust gas purification means;

oxygen concentration detection means that detects an oxygen concentration of the exhaust gas;

operational state detection means that detects an operational state of the internal combustion engine;

constant-speed operation determination means that determines, on the basis of an operational state detected by the operational state detection means, whether or not the internal combustion engine is in a constant-speed operational state; and abnormality determination means that determines, on the basis of an oxygen concentration detected by the oxygen concentration detection means, whether or not the addition agent supply means is abnormal, wherein the abnormality determination means determines that the addition agent supply means is abnormal if an oxygen concentration minimum value of the exhaust gas which decreases through addition of the addition agent by the addition agent supply means successively becomes equal to or larger than a predetermined value a predetermined number of times of addition when the constant-speed operation determination means determines that the internal combustion engine is in constant-speed operation.

9. The control device according to claim 8, further comprising:

abnormality display means that displays an abnormality of the addition agent supply means if the abnormality determination means determines that the addition agent supply means is abnormal.

10. A control method for an internal combustion engine including exhaust gas purification means that is installed in an exhaust passage of the internal combustion engine and that purifies exhaust gas, and addition agent supply means that intermittently adds an addition agent to exhaust gas to purify exhaust gas by means of the exhaust gas purification means, comprising the steps of:

detecting an oxygen concentration of the exhaust gas; and determining that the addition agent supply means is abnormal if the oxygen concentration of the exhaust gas remains equal to or lower than a predetermined concentration for a predetermined period.

11. The control method according to claim 10, wherein the predetermined concentration is set in accordance with an operational state of the internal combustion engine.

12. The control method according to claim 10, wherein the predetermined period is set in accordance with an operational state of the internal combustion engine.

13. A control method for an internal combustion engine including exhaust gas purification means that is installed in an exhaust passage of the internal combustion engine and that purifies exhaust gas, and addition agent supply means that intermittently adds an addition agent to exhaust gas to purify exhaust gas by means of the exhaust gas purification means, comprising the steps of:

detecting an oxygen concentration of the exhaust gas;

detecting an operational state of the internal combustion engine;

determining, on the basis of an operational state detected, whether or not the internal combustion engine is in a constant-speed operational state; and if a rate of change in a decrease in oxygen concentration of the exhaust gas becomes equal to or larger than a first predetermined value when it is determined that the internal combustion engine is in constant-speed operation, calculating a ratio between an oxygen concentration of the exhaust gas within a predetermined period from the time when the rate of change becomes equal to or larger than the first predetermined value and an oxygen concentration minimum value of the exhaust gas within the predetermined period; and determining that the addition agent supply means is abnormal if the ratio is equal to or smaller than a second predetermined value.

14. A control method for an internal combustion engine including exhaust gas purification means that is installed in an exhaust passage of the internal combustion engine and that purifies exhaust gas, and addition agent supply means that intermittently adds an addition agent to exhaust gas to purify exhaust gas by means of the exhaust gas purification means, comprising the steps of:

detecting a temperature of the exhaust gas purification means; and determining that the addition agent supply means is abnormal if the temperature of the exhaust gas purification means remains equal to or higher than a predetermined temperature for a predetermined period.

15. The control method according to claim 10, further comprising the steps of:

restricting an operational state of the internal combustion engine if it is determined that the addition agent supply means is abnormal; and displaying an abnormality of the addition agent supply means if it is determined that the addition agent supply means is abnormal.

16. The control method according to claim 15, wherein the restriction of the operational state is to a low-speed/low-load operational state and reduces an oxygen concentration of the exhaust gas.

17. A control method for an internal combustion engine including exhaust gas purification means that is installed in an exhaust passage of the internal combustion engine and that purifies exhaust gas, and addition agent supply means that intermittently adds an addition agent to exhaust gas to purify exhaust gas by means of the exhaust gas purification means, comprising the steps of:

detecting an oxygen concentration of the exhaust gas;

detecting an operational state of the internal combustion engine;

determining, on the basis of an operational state detected, whether or not the internal combustion engine is in a constant-speed operational state; and determining that the addition agent supply means is abnormal if an oxygen concentration minimum value of the exhaust gas which decreases through addition of the addition agent by the addition agent supply means successively becomes equal to or larger than a predetermined value a predetermined number of times of addition when it is determined that the internal combustion engine is in constant-speed operation.

18. The control method according to claim 17, further comprising the step of displaying an abnormality of the addition agent supply means if it is determined that the addiction agent supply means is abnormal.

19. A control device for an internal combustion engine, comprising:

an exhaust gas purification device that is installed in an exhaust passage of the internal combustion engine and that purifies exhaust gas;

an addition agent supply device that intermittently adds an addition agent to exhaust gas to purify exhaust gas by the exhaust gas purification device;

an oxygen concentration detector that detects an oxygen concentration of the exhaust gas; and an abnormality determination device that determines, on the basis of an oxygen concentration detected by the oxygen concentration detector, whether or not the addition agent supply device is abnormal, wherein the abnormality determination device determines that the addition agent supply device is abnormal if the oxygen concentration of the exhaust gas remains equal to or lower than a predetermined concentration for a predetermined period.

20. A control device for an internal combustion engine, comprising:

an exhaust gas purification device that is installed in an exhaust passage of the internal combustion engine and that purifies exhaust gas;

an addition agent supply device that intermittently adds an addition agent to exhaust gas to purify exhaust gas by the exhaust gas purification device;

an oxygen concentration detector that detects an oxygen concentration of the exhaust gas;

an operational state detector that detects an operational state of the internal combustion engine;

a constant-speed operation determination device that determines, on the basis of an operational state detected by the operational state detector, whether or not the internal combustion engine is in a constant-speed operational state; and an abnormality determination device that determines, on the basis of an oxygen concentration detected by the oxygen concentration detector, whether or not the addition agent supply device is abnormal, wherein if a rate of change in a decrease in oxygen concentration of the exhaust gas becomes equal to or larger than a first predetermined value when the constant-speed operation determination device determines that the internal combustion engine is in constant-speed operation, the abnormality determination device calculates a ratio between an oxygen concentration of the exhaust gas within a predetermined period from the time when the rate of change becomes equal to or larger than the first predetermined value and an oxygen concentration minimum value of the exhaust gas within the predetermined period, and wherein if the ratio is equal to or smaller than a second predetermined value, the abnormality determination device determines that the addition agent supply device is abnormal.

21. A control device for an internal combustion engine, comprising:

an exhaust gas purification device that is installed in an exhaust passage of the internal combustion engine and that purifies exhaust gas;

an addition agent supply device that intermittently adds an addition agent to exhaust gas to purify exhaust gas by the exhaust gas purification device;

a temperature detector that detects a temperature of the exhaust gas purification device; and an abnormality determination device that determines, on the basis of a temperature of the exhaust gas purification means detected by the temperature detector, whether or not the addition agent supply device is abnormal, wherein the abnormality determination device determines that the addition agent supply device is abnormal if the temperature of the exhaust gas purification device remains equal to or higher than a predetermined temperature for a predetermined period.

22. A control device for an internal combustion engine, comprising:

an exhaust gas purification device that is installed in an exhaust passage of the internal combustion engine and that purifies exhaust gas;

an addition agent supply device that intermittently adds an addition agent to exhaust gas to purify exhaust gas by the exhaust gas purification device;

an oxygen concentration detector that detects an oxygen concentration of the exhaust gas;

an operational state detector that detects an operational state of the internal combustion engine;

a constant-speed operation determination device that determines, on the basis of an operational state detected by the operational state detector, whether or not the internal combustion engine is in a constant-speed operational state; and an abnormality determination device that determines, on the basis of an oxygen concentration detected by the oxygen concentration detector, whether or not the addition agent supply device is abnormal, wherein the abnormality determination device determines that the addition agent supply device is abnormal if an oxygen concentration minimum value of the exhaust gas which decreases through addition of the addition agent by the addition agent supply device successively becomes equal to or larger than a predetermined value a predetermined number of times of addition when the constant-speed operation determination device determines that the internal combustion engine is in constant-speed operation.

23. The control device according to claim 4, further comprising:
- operational state restriction means that restricts an operational state of the internal combustion engine if the abnormality determination means determines that the addition agent supply means is abnormal; and
- abnormality display means that displays an abnormality of the addition agent supply means if the abnormality determination means determines that the addition agent supply means is abnormal.

24. The control device according to claim 23, wherein the operational state restriction means restricts the internal combustion engine to a low-speed/low-load operational state and reduces an oxygen concentration of the exhaust gas.

25. The control device according to claim 5, further comprising:
- operational state restriction means that restricts an operational state of the internal combustion engine if the abnormality determination means determines that the addition agent supply means is abnormal; and
- abnormality display means that displays an abnormality of the addition agent supply means if the abnormality determination means determines that the addition agent supply means is abnormal.

26. The control device according to claim 25, wherein the operational state restriction means restricts the internal combustion engine to a low-speed/low-load operational state and reduces an oxygen concentration of the exhaust gas.

27. The control method according to 13, further comprising the steps of:
- restricting an operational state of the internal combustion engine if it is determined that the addition agent supply means is abnormal; and
- displaying an abnormality of the addition agent supply means if it is determined that the addition agent supply means is abnormal.

28. The control method according to claim 27, wherein the restriction of the operational state is to a low-speed/low-load operational state and reduces an oxygen concentration of the exhaust gas.

29. The control method according to 14, further comprising the steps of:
- restricting an operational state of the internal combustion engine if it is determined that the addition agent supply means is abnormal; and
- displaying an abnormality of the addition agent supply means if it is determined that the addition agent supply means is abnormal.

30. The control method according to claim 29, wherein the restriction of the operational state is to a low-speed/low-load operational state and reduces an oxygen concentration of the exhaust gas.

* * * * *